(12) United States Patent
Zhang et al.

(10) Patent No.: US 11,595,981 B2
(45) Date of Patent: Feb. 28, 2023

(54) METHOD AND APPARATUS FOR TRANSMITTING INFORMATION, METHOD AND APPARATUS FOR RECEIVING INFORMATION

(71) Applicant: ZTE CORPORATION, Shenzhen (CN)

(72) Inventors: Wen Zhang, Shenzhen (CN); Shuqiang Xia, Shenzhen (CN); Chunli Liang, Shenzhen (CN); Jing Shi, Shenzhen (CN); Xianghui Han, Shenzhen (CN); Wenfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 669 days.

(21) Appl. No.: 16/325,053

(22) PCT Filed: Aug. 7, 2017

(86) PCT No.: PCT/CN2017/096165
§ 371 (c)(1),
(2) Date: Feb. 12, 2019

(87) PCT Pub. No.: WO2018/028530
PCT Pub. Date: Feb. 15, 2018

(65) Prior Publication Data
US 2021/0282169 A1    Sep. 9, 2021

(30) Foreign Application Priority Data

Aug. 12, 2016   (CN) .......................... 201610666581.1

(51) Int. Cl.
*H04W 72/12* (2009.01)
*H04W 72/04* (2009.01)
(Continued)

(52) U.S. Cl.
CPC ....... *H04W 72/1289* (2013.01); *H04L 1/1819* (2013.01); *H04L 1/1896* (2013.01);
(Continued)

(58) Field of Classification Search
None
See application file for complete search history.

(56) References Cited

U.S. PATENT DOCUMENTS

2012/0004002 A1   1/2012  Nanri et al.
2014/0293932 A1*  10/2014 Papasakellariou .... H04L 1/0031
                                                       370/329
(Continued)

FOREIGN PATENT DOCUMENTS

CN      102084710 A       6/2011
CN      103369650 A      10/2013
(Continued)

OTHER PUBLICATIONS

Huawei, Hisilicon. "Handling collision between sTTI and 1ms TTI", 3GPP TSG RAN WG1 Meeting #86bis, Lisbon, Portugal, Oct. 10-14, 2016, 5 Pages.

(Continued)

*Primary Examiner* — Steve R Young
(74) *Attorney, Agent, or Firm* — Li & Cai Intellectual Property (USA) Office

(57) ABSTRACT

A method for transmitting information, includes: transmitting on one carrier wave according to at least one of a preset transmission mode and a transmission mode indicated by a base station eNB when agreed transmission time of two or more physical uplink shared channels PUSCH overlaps.

9 Claims, 6 Drawing Sheets

---

On one carrier wave, when agreed transmission times of two or more PUSCHs overlap, a transmitting terminal transmitting information of the two or more PUSCHs according to at least one of a preset transmission mode and a transmission mode indicated by an eNB — S101

On one carrier wave, a receiving terminal receiving the information according to said transmission mode — S102

(51) Int. Cl.
  *H04W 72/10* (2009.01)
  *H04L 1/18* (2006.01)
  *H04L 1/1812* (2023.01)
  *H04L 1/1867* (2023.01)
  *H04W 72/0453* (2023.01)
  *H04W 72/1268* (2023.01)

(52) U.S. Cl.
  CPC ... *H04W 72/0413* (2013.01); *H04W 72/0453* (2013.01); *H04W 72/10* (2013.01); *H04W 72/1268* (2013.01)

(56) References Cited

U.S. PATENT DOCUMENTS

| | | | |
|---|---|---|---|
| 2015/0036618 A1* | 2/2015 | Xu | H04L 5/0053 370/329 |
| 2015/0078314 A1 | 3/2015 | Choi et al. | |
| 2016/0065341 A1 | 3/2016 | Yoo et al. | |
| 2018/0160376 A1* | 6/2018 | Hwang | H04W 52/146 |
| 2019/0045527 A1* | 2/2019 | Shimezawa | H04W 72/0446 |
| 2019/0098622 A1* | 3/2019 | Lee | H04W 52/365 |
| 2019/0230600 A1* | 7/2019 | Gao | H04W 72/0446 |

FOREIGN PATENT DOCUMENTS

| | | |
|---|---|---|
| CN | 105409153 A | 3/2016 |
| CN | 105594134 A | 5/2016 |

OTHER PUBLICATIONS

Huawei, Hisilicon. "UCI on sPUSCH", 3GPP TSG RAN WG1 Meeting #86, Gothenburg, Sweden, Aug. 22-26, 2016, 6 Pages.
English Translation of International Search Report for International Application No. PCT/CN2017/096165, dated Oct. 27, 2017, 2 pages.
European Paent Office, Extended European Search Report dated Nov. 8, 2019 for EP17838660.3.
Europeant Patent Office, The Partial supplementary European Search Report dated Jul. 27, 2019 for EP17838660.3.
Nokia Networks, et al., "Considerations of FDD DL HARQ for Supporting Latency Reduction", 3GPP TSG RAN WG1 Meeting #84, Feb. 14, 2016, http://www.3gpp.org/ftp/Meetings_3GPP_SYNC/RAN1/Docs/.
Samsung, "Study on specification impact for uplink due to TTI shortening", 3GPP TSG RAN WG1 Meeting #83, Nov. 15, 2015.
Huawei, et al., "Handling collision between sTTI and 1ms TTI", 3GPP TSG RAN WG1 Meeting #86bis, Oct. 1, 2016.
Huawei, et al., "UCI on sPUSCH", 3GPP TSG RAN WG1 Meeting #86, Aug. 12, 2016.
China Patent Office, CN201610666581.1 First Office Action dated Sep. 28, 2022.
Asustek, "Impact of shortened TTI on uplink transmission", 3GPP TSG RAN WG1 Meeting #85, May 14, 2016.
Samsung, "Study on specification impact for uplink due to TTI shortening", 3GPP TSG RAN WG1 #83, Nov. 7, 2015.
Nokia Networks, et al., "Considerations of FDD DL HARQ for Supporting Latency Reduction", 3GPP TSG-RAN WG1 Meeting #84, Feb. 5, 2016.

\* cited by examiner

```
                      ┌──────────────────────────────────────────────────────────────┐
                      │ On one carrier wave, when agreed transmission times of two or more PUSCHs │  S101
                      │ overlap, a transmitting terminal transmitting information of the two or more │
                      │ PUSCHs according to at least one of a preset transmission mode and a │
                      │         transmission mode indicated by an eNB                │
                      └──────────────────────────────────────────────────────────────┘
                                              │
                                              ▼
                      ┌──────────────────────────────────────────────────────────────┐
                      │ On one carrier wave, a receiving terminal receiving the information according to │  S102
                      │                    said transmission mode                   │
                      └──────────────────────────────────────────────────────────────┘
```

FIG. 1

```
                      ┌──────────────────────────────────────────────────────────────┐  S201
                      │      A transmitting terminal transmits information on one carrier wave      │
                      └──────────────────────────────────────────────────────────────┘
                                              │
                                              ▼
                      ┌──────────────────────────────────────────────────────────────┐
                      │ A receiving terminal receives the information on one carrier wave according to at │  S202
                      │ least one of a preset receiving mode and a receiving mode indicated by the eNB │
                      │      when agreed transmission time of two or more PUSCHs overlaps      │
                      └──────────────────────────────────────────────────────────────┘
```

FIG. 2

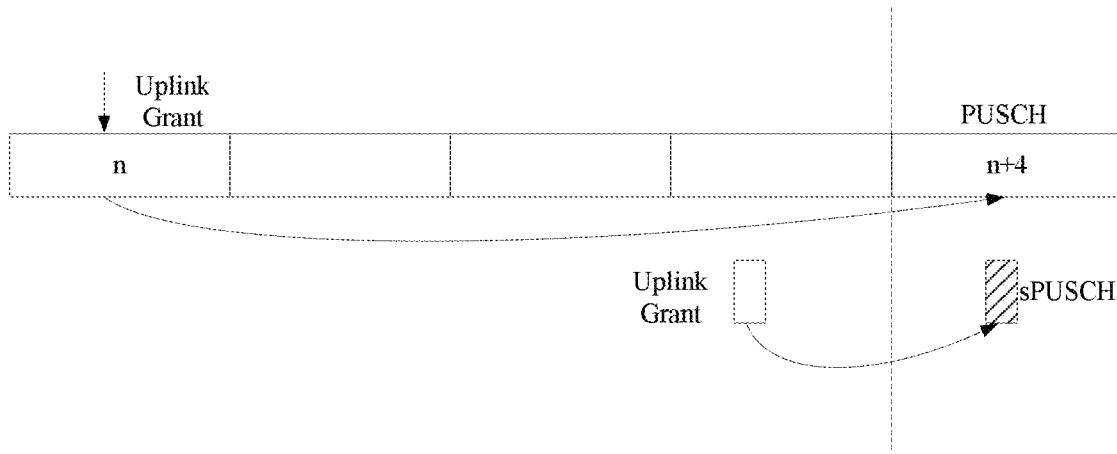

FIG. 3

METHOD AND APPARATUS FOR TRANSMITTING INFORMATION, METHOD AND APPARATUS FOR RECEIVING INFORMATION

CROSS REFERENCE

This application is the 371 application of PCT Application No. PCT/CN2017/096165 filed Aug. 7, 2017, which is based upon and claims priority to Chinese Patent Application No. 201610666581.1, filed on Aug. 12, 2016 the entire contents thereof are incorporated herein by reference.

TECHNICAL FIELD

The present application relates to, but is not limited to, the field of radio communications, and more particularly, to a method and an apparatus for transmitting information, and a method and an apparatus for receiving information.

BACKGROUND

The rapid development of the mobile Internet and the Internet of Things has led to explosive growth of data traffic and extensive rising of diversified and differentiated services. As a new generation of mobile communication technology, 5G (5th-Generation, the fifth-generation mobile communication technology) will support, compared to 4G (4th-Generation, the fourth-generation mobile communication technology) higher rate (Gbps), massive links (1M/ $Km^2$), ultra-low latency (1 ms), higher reliability, hundred-fold energy efficiency improvement, etc. to support new demand changes. As a key indicator of the 5G technology, the ultra-low latency directly affects the development of delay-constrained services such as Internet of Vehicles, industrial automation, remote control, and smart grid, etc. Currently, study on a series of standards related to 5G delay reduction is gradually pushed forward.

As an important research direction for the current delay reduction, reduction of transmission time interval (TTI) is intended to reduce the current TTI length of 1 millisecond (ms) to 0.5 ms or even a length of 1 to 2 Orthogonal Frequency Division Multiplexing (OFDM), such that the minimum scheduling time may be exponentially reduced, and the single transmission delay may be exponentially reduced without changing the frame structure. The TTI having the length of 0.5 ms or even 1 to 2 OFDM symbols is referred to as short TTI (sTTI), and 3GPP (Third Generation Partnership Project) has discussed the short TTI delay reduction technology.

In the short TTI technology, user equipment (UE) needs to support the short TTI and the existing 1 ms TTI, and the UE may be dynamically switched therebetween. When a physical uplink shared channel (PUSCH) of the short TTI and a PUSCH transmitting the 1 ms TTI overlap in time, there is no effective solution to how to transmit.

SUMMARY

The following is an overview to the subject described in detail herein. This overview is not intended to limit the scope of protection of the claims.

Embodiments of the present application provide a method and an apparatus for transmitting information, and a method and an apparatus for receiving information to implement information transmission in the case that PUSCHs having different TTI lengths overlap on agreed transmission time.

In a first aspect, an embodiment of the present application provides a method for transmitting information, which is applied to a transmitting terminal. The method includes: on one carrier wave, when agreed transmission times of two or more physical uplink shared channels (PUSCH) overlap, performing transmission according to at least one of a preset transmission mode and a transmission mode indicated by a base station (Evolved Node B, abbreviated as eNB).

In a second aspect, an embodiment of the present application further provides an apparatus for transmitting information, which is applied to a transmitting terminal. The apparatus includes: a sending unit, which is configured to transmit on one carrier wave according to at least one of a preset transmission mode and a transmission mode indicated by an eNB when agreed transmission time of two or more PUSCHs overlaps.

In a third aspect, an embodiment of the present application provides a method for receiving information, which is applied to a receiving terminal. The method includes: receiving on one carrier wave according to at least one of a preset receiving mode and a receiving mode indicated by an eNB when agreed transmission time of two or more PUSCHs overlaps.

In a fourth aspect, an embodiment of the present application further provides an apparatus for receiving information. The apparatus includes a receiving unit, wherein the receiving unit is configured to receive on one carrier wave according to at least one of a preset receiving mode and a receiving mode indicated by an eNB when agreed transmission time of two or more PUSCHs overlaps.

Furthermore, an embodiment of the present application also provides a computer-readable medium storing a program for transmitting information. When the program is executed by a processor, steps of the method for transmitting information according to the first aspect are implemented.

Moreover, an embodiment of the present application further provides a computer-readable medium storing a program for receiving information. When the program is executed by a processor, steps of the method for receiving information according to the third aspect are implemented.

According to the method and the apparatus for transmitting information and the method and the apparatus for receiving information provided by the embodiments of the present application, on one carrier wave, when agreed transmission time of two or more PUSCHs overlap, information of the two or more PUSCHs is transmitted according to at least one of a preset transmission mode and a transmission mode indicated by an eNB. In this way, information transmission in the case that PUSCHs having different TTI lengths overlap on agreed transmission time is implemented.

Other aspects may be apparent after reading and understanding the accompany drawings and detailed description.

BRIEF DESCRIPTION OF THE DRAWINGS

FIG. 1 is a schematic flow diagram illustrating a method for transmitting information according to an embodiment of the present application;

FIG. 2 is a schematic flow diagram illustrating a method for receiving information according to an embodiment of the present application;

FIG. 3 is a schematic diagram illustrating that agreed transmission time of two PUSCHs overlaps according to an embodiment of the present application;

DETAILED DESCRIPTION

Figure 4:
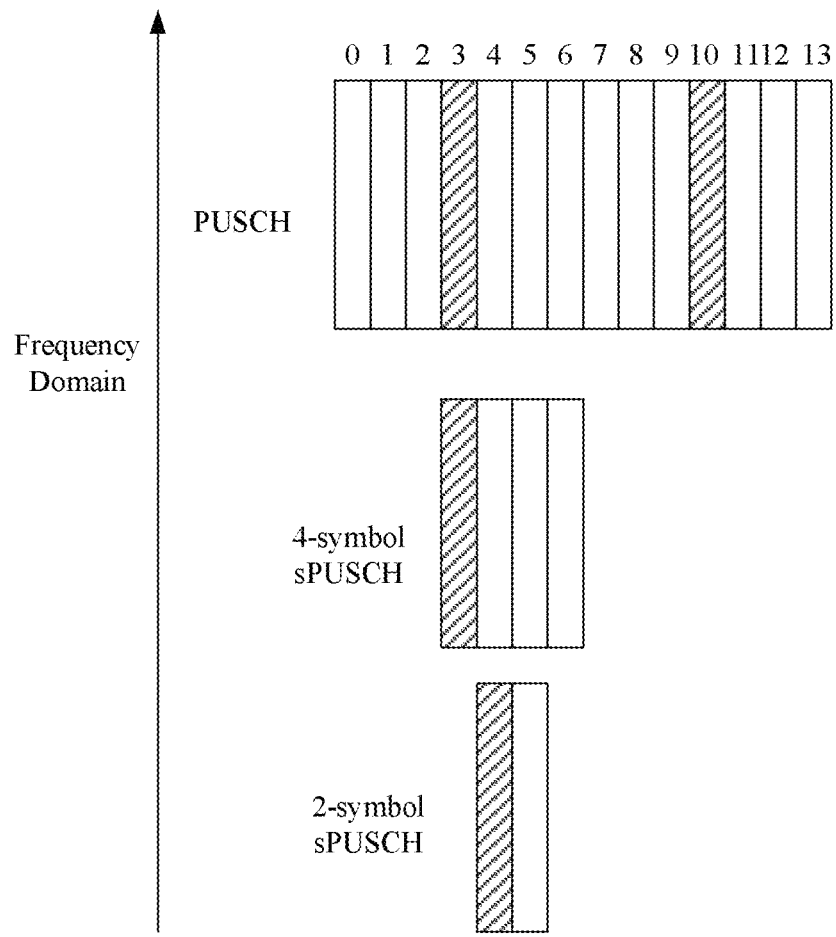
FIG. 4 is a schematic diagram illustrating that agreed transmission time of three PUSCHs overlaps according to an embodiment of the present application.

The embodiments of the present application are further described in detail below with reference to the accompanying drawings.

FIG. 1 is a schematic flow diagram illustrating a method for transmitting information according to an embodiment of the present application. As shown in FIG. 1, the method provided by this embodiment includes the following steps.

In Step S101, when agreed transmission time of two or more PUSCHs overlaps, a transmitting terminal transmits, on one carrier wave, information of the two or more PUSCHs according to at least one of a preset transmission mode and a transmission mode indicated by an eNB.

When the transmitting terminal (for example, a user equipment, abbreviated as UE) transmits information, it is detected on the same carrier wave, the agreed transmission time of different PUSCHs overlap. At this moment, information of the PUSCHs whose agreed transmission time overlap is transmitted according to a transmission mode preset by the transmitting terminal or a transmission mode indicated by a base station (eNB), or in combination with the preset transmission mode configured by the transmitting terminal and the transmission mode indicated by the base station.

In the present application, two or more means at least two, i.e., including two or more.

Here, at least one of transmission time interval (TTI) lengths corresponding to the two or more PUSCHs is different. That is, the above transmission mode is applicable to two cases where the TTIs of the PUSCHs whose agreed transmission time overlaps are consistent or inconsistent. Here, when the TTIs of the two or more PUSCHs whose agreed transmission time overlaps are inconsistent, the PUSCH corresponding to the minimum TTI length among the two or more PUSCHs is a first PUSCH, the PUSCH except the first PUSCH among the two or more PUSCHs is a second PUSCH, and the PUSCH corresponding to the subminimal TTI length among the two or more PUSCHs is a third PUSCH. Here, the second PUSCH may be one or more of the PUSCHs except the first PUSCH among the two or more PUSCHs. For example, when the TTIs of the PUSCHs whose agreed transmission time overlaps respectively are 1 ms, 7 symbols and 2 symbols, the PUSCH whose TTI length is 2 symbols is the first PUSCH, the PUSCHs whose TTI lengths are 7 symbols and 1 ms are the second PUSCH, and the PUSCH whose TTI length is 7 symbols is the third PUSCH.

Here, the transmission mode may include one of:

transmitting information of the first PUSCH within the agreed transmission time;

writing, within the agreed transmission time, the information of the first PUSCH into columns corresponding to symbols corresponding to the first PUSCH in an interleaving matrix corresponding to the third PUSCH;

transmitting, on a symbol corresponding to the first PUSCH, the information of the first PUSCH; and transmitting, on a symbol except the symbol corresponding to the first PUSCH among symbols corresponding to the third PUSCHs, information of the third PUSCH;

transmitting the two or more PUSCHs when frequency domain resources of the two or more PUSCHs do not overlap; and sending each PUSCH according to priorities of the two or more PUSCHs.

Here, the method of this embodiment may further include: determining a transmission mode according to the TTI lengths corresponding to the two or more PUSCHs. For example, when the agreed transmission time of three PUSCHs with lengths of 2 symbols, 4 symbols and 7 symbols overlaps, a corresponding transmission mode is determined according to the 2 symbols, the 4 symbols and the 7 symbols. When the agreed transmission time of three PUSCHs with lengths of 2 symbols, 4 symbols and 14 symbols overlaps, a corresponding transmission mode is determined according to the 2 symbols, the 4 symbols and the 14 symbols. Here, the transmission mode corresponding to different TTI lengths may be the same or may be different.

Here, the method of this embodiment may further include: determining the transmission mode according to the TTI length corresponding to the first PUSCH among the two or more PUSCHs. For example, when the TTI length of the first PUSCH is 2 symbols, information may be transmitted using a transmission mode I. When the TTI length of the first PUSCH is 7 symbols, the information may be transmitted using a transmission mode V. Here, the information may be transmitted using a transmission mode II no matter the TTI length is 2 symbols or 7 symbols.

A variety of transmission modes are described below.

Transmission Mode I

In the transmission mode I, the first PUSCH is transmitted. For a second PUSCH, transmission of the second PUSCH is abandoned, or the transmission of the second PUSCH is deferred until after the agreed transmission time of the second PUSCH.

When the transmission of the second PUSCH is abandoned, the second PUSCH including uplink control information (UCI) carried therein may be abandoned, only the first PUSCH is transmitted, and in a later subframe, the abandoned second PUSCH is not retransmitted.

When the transmission of the second PUSCH is deferred, the second PUSCH is not transmitted on the subframe corresponding to the agreed transmission time, instead, the transmission of the second PUSCH is deferred until after the agreed transmission time, for example, the transmission of the second PUSCH is deferred to a next idle subframe not scheduling a PUSCH. Here, in the case that the second PUSCH is not transmitted in the subframe if the agreed transmission time overlaps, the transmission of the second PUSCH is deferred to a next subframe. When the next subframe also schedules a PUSCH, the transmission of the second PUSCH is further deferred until it is detected a subframe not scheduling the PUSCH. At this time, the deferred second PUSCH is transmitted in this subframe, and the second PUSCH is transmitted.

In this transmission mode, when the information of the second PUSCH carries uplink control information (UCI), the UCI is transmitted on the first PUSCH. Here, when transmitting the information of the first PUSCH, the UCI of the second PUSCH is transmitted on the first PUSCH that transmits the information of the first PUSCH, and transmission of the data information of the second PUSCH is abandoned. In this way, it is ensured that the UCI of the second PUSCH is also transmitted when transmitting the information of the first PUSCH. All information or partial information of the UCI of the second PUSCH is transmitted on the first PUSCH.

In this transmission mode, when the information of the second PUSCH carries the UCI and if the UCI includes appointed information, the appointed information is transmitted on the first PUSCH. Here, the appointed information may include: HARQ-ACK (Hybrid Automatic Repeat reQuest-Acknowledgement); or at least one of HARQ-ACK and RI (Rank Indication)/CRI (CSI-RS Resource Indication, CSI-RS (Channel State Information-Reference Signal)); or one of HARQ-ACK, RI/CRI and a preset type of CQI (Channel Quality Indicator)/PMI (Pre-coding Matrix Indicator.

It is to be noted that, in the present application, the RI/CRI refers to the RI or the CRI; and the CQI/PMI refers to at least one of the CQI and the PMI.

In this transmission mode, it is selected to transmit a PUSCH with the minimum TTI length (i.e., the first PUSCH), and the UCI of the other PUSCHs is transmitted on this PUSCH or the other PUSCHs are abandoned, such that only one PUSCH is transmitted, thereby ensuring normal transmission of the information of the transmitting terminal.

Transmission Mode II

In the transmission mode II, the third PUSCH is transmitted. At this moment, transmission of the PUSCH except the third PUSCH among the two or more PUSCHs may be abandoned, or the transmission of the PUSCH except the third PUSCH among the two or more PUSCHs may be deferred until after the agreed transmission time.

In an interleaving matrix corresponding to the third PUSCH, information of the first PUSCH is written into columns corresponding to all or a part of symbols corresponding to the first PUSCH in the interleaving matrix. In this transmission mode, transmission of information of different PUSCHs is implemented by puncturing, wherein the information of the first PUSCH is punctured and transmitted on the PUSCH. Herein the puncturing refers to puncturing and transmitting the information of the first PUSCH on the interleaving matrix of the second PUSCH when interleaving a channel before discrete Fourier transform (DFT). Here, resource allocation corresponding to the information of the third PUSCH is the same as that corresponding to the information of the first PUSCH. That is, the resource allocation in an uplink grant scheduling the first PUSCH is the same as that in an uplink grant scheduling the third PUSCH. In this transmission method, after the information of two PUSCHs is punctured, the information is transmitted through one PUSCH. The information of the PUSCH having a shorter TTI length is punctured to the information of the PUSCH having a longer TTI length. In this way, the delay performance of the shorter TTI length is guaranteed.

Here, when the information of the third PUSCH contains uplink control information (UCI) and the symbol corresponding to the first PUSCH overlaps with a symbol corresponding to the UCI, a location corresponding to the UCI is skipped when writing the information of the first PUSCH into the interleaving matrix. When the symbol corresponding to the first PUSCH overlaps with a symbol corresponding to Hybrid Automatic Repeat reQuest-Acknowledgement (HARQ-ACK) of the third PUSCH and in the case that the third PUSCH contains HARQ-ACK information or the third PUSCH does not contain the HARQ-ACK information, a location corresponding to the HARQ-ACK is skipped when writing the information of the first PUSCH into the interleaving matrix. Here, for the third PUSCH, no matter whether the third PUSCH contains the HARQ-ACK information, the location corresponding to the HARQ-ACK of the third PUSCH is skipped in the puncturing process when a symbol corresponding to the first PUSCH overlaps with a symbol corresponding to the HARQ-ACK of the third PUSCH.

When the information of the third PUSCH contains first UCI and the symbol corresponding to the first PUSCH overlaps with a symbol corresponding to the UCI in the information of the third PUSCH, a location corresponding to partial information or all information of the first UCI in the information of the third PUSCH is skipped when writing the information of the first PUSCH into the interleaving matrix. The first PUSCH includes at least one of RI/CRI and CQI/PMI.

When the information of the third PUSCH contains HARQ-ACK and the symbol corresponding to the first PUSCH overlaps with a symbol corresponding to the HARQ-ACK in the information of the third PUSCH, the information of the first PUSCH is written into the interleaving matrix, and then the HARQ-ACK is written.

In a transmission process, when transmitting based on a transport block of the first PUSCH and a transport block of the third PUSCH, the method of this embodiment may further include:

when the third PUSCH contains two transport blocks and the first PUSCH contains one transport block, retransmitting the transport block of the first PUSCH on the two transport blocks of the third PUSCH;

when the third PUSCH contains two transport blocks and the first PUSCH contains one transport block, transmitting the transport block of the first PUSCH on either one of the two transport blocks of the third PUSCH;

when the third PUSCH contains two transport blocks and the first PUSCH contains two transport block, transmitting the two transport blocks of the first PUSCH respectively on the two transport blocks of the third PUSCH; and when the third PUSCH contains one transport block and the first PUSCH contains two transport blocks, transmitting the two transport blocks of the first PUSCH the one transport block of the third PUSCH.

When transmitting the transport block of the first PUSCH on either transport block of the third PUSCH, the number of transport layers for transmitting the first PUSCH is determined by one of:

downlink control information (DCI) for scheduling the first PUSCH; and retransmitting, when the number of the transport layers of the transport block of the first PUSCH is equal to 1 and the number of the transport layers of the transport block of the third PUSCH is greater than 1, the first PUSCH on all the transport layers of the third PUSCH.

When the third PUSCH contains two transport blocks and the first PUSCH contains one transport block, the information of the first PUSCH is transmitted on either transport block of the third PUSCH, and the transport block transmitting the third PUSCH may be one of:

a transport block having a maximal modulation and coding scheme (MCS); and a preset transport block.

When the agreed transmission time of PUSCHs having more than two TTI lengths overlaps, to ensure the delay performance of the PUSCH having a shorter TTI length, two PUSCHs having the shortest TTI length are processed in the way above.

Transmission Mode III

In the transmission mode III, the first PUSCH is transmitted on a symbol corresponding to the first PUSCH, and the third PUSCH is transmitted on a symbol except the symbol corresponding to the first PUSCH among symbols corresponding to the third PUSCHs. Here, the information of the two PUSCHs is transmitted through one PUSCH, and on the symbol corresponding to the first PUSCH, only the information of the first PUSCH is transmitted, but the information of the third PUSCH is not transmitted. However, the information of the third PUSCH is still transmitted on the remaining symbols corresponding to the third PUSCH. Specifically, the information of the PUSCH having a shorter TTI length is completely transmitted, whereas the information of the PUSCH having a longer TTI length is partially transmitted or abandoned.

In this transmission mode, transmission of a fourth PUSCH is abandoned, or the transmission of the fourth PUSCH is deferred until after the agreed transmission time of the fourth PUSCH, wherein the fourth PUSCH is a PUSCH except the first PUSCH and the third PUSCH among the two or more PUSCHs. At this moment, the first PUSCH and the third PUSCH are transmitted, the transmission of the fourth PUSCH is abandoned or deferred. Specifically, the transmission of the information of the fourth PUSCH may be deferred to a next idle subframe.

In this transmission mode, when at least one of the information of the third PUSCH and the information of the fourth PUSCH contains UCI, the UCI is transmitted on the first PUSCH. Here, when at least one of the information of the third PUSCH and the information of the fourth PUSCH carries UCI and if the UCI contains appointed information, the appointed information is transmitted on the first PUSCH. All information or partial information of the UCI may be transmitted on the first PUSCH. Abandoning transmission of data information may avoid an effect on control information.

Here, when the information of the third PUSCH contains UCI and a symbol corresponding to the UCI overlaps with a symbol corresponding to the first PUSCH, the UCI is transmitted on the first PUSCH. Here, it may be selected to transmit partial information of the UCI or to transmit all information of the UCI.

When the information of the third PUSCH carries UCI and if the UCI contains appointed information, the appointed information is transmitted on the first PUSCH.

The transmitting terminal does not expect to receive first DCI, the first DCI schedules the transmitting terminal to transmit on an appointed symbol, and the appointed symbol includes at least one of:

a symbol corresponding to HARQ-ACK corresponding to at least one of the third PUSCH and the fourth PUSCH;

if at least one of the third PUSCH and the fourth PUSCH contains RI or CRI, the appointed symbol is a symbol corresponding to the RI or the CRI; and if at least one of the third PUSCH and the fourth PUSCH contains CQI/PMI, the appointed symbol is a symbol corresponding to the CQI/PMI.

The transmission mode may further include: generating a demodulation reference signal (DMRS) based on a frequency domain span of the first PUSCH and a frequency domain span of the third PUSCH when the symbol corresponding to the first PUSCH overlaps with the symbol corresponding to the DMRS of the third PUSCH.

Here, the transmission mode may include: only transmitting an appointed PUSCH on one transmission symbol, wherein the appointed PUSCH satisfies one of following conditions: only the agreed transmission time of the appointed PUSCH among the two or more PUSCHs includes the transmission symbol; the agreed transmission time of a plurality of PUSCHs among the two or more PUSCHs includes the transmission symbol, and among the plurality of PUSCHs, the TTI length corresponding to the appointed PUSCH is the minimum. The transmission symbol is one symbol in a set of symbols contained in the agreed transmission time of the two or more PUSCHs.

Here, when information of the second PUSCH carries UCI, the UCI may be transmitted on the first PUSCH. When the information of the second PUSCH carries UCI and if the UCI contains appointed information, the appointed information is transmitted on the first PUSCH.

Transmission Mode IV

In the transmission mode IV, when frequency domain resources of the two or more PUSCHs do not overlap, the two or more PUSCHs are transmitted. Here, when the frequency domain resources do not overlap, information of different PUSCHs is transmitted on the frequency domain resources corresponding to the PUSCHs, and meanwhile the information of each PUSCH is transmitted. When the first PUSCH overlaps with the DMRS of the second PUSCH, the DMRS is generated based on total frequency domain resources of the two or more PUSCHs.

Here, when the first PUSCH overlaps with the DMRS of the second PUSCH, a DMRS sequence may be generated based on total frequency domain resources corresponding to the first PUSCH and the second PUSCH, and then the DMRS sequence is respectively mapped to the total frequency domain resources corresponding to the first PUSCH and the second PUSCH in one symbol.

Transmission Mode V

In the transmission mode V, PUSCHs are transmitted based on priorities of different PUSCHs. Specifically, a priority is determined based on at least one of a fact whether the two or more PUSCHs carry UCI and the UCI carried, it is selected to transmit the PUSCH having a top priority, and transmission of the remaining PUSCHs is abandoned or deferred until after the agreed transmission time of the remaining PUSCHs, wherein the remaining PUSCHs are PUSCHs except the PUSCH having the top priority among the two or more PUSCHs.

The determining a priority based on at least one of a fact whether the two or more PUSCHs carry UCI and the UCI carried may include at least one of:

the priority of a PUSCH carrying the UCI is higher than that of a PUSCH not carrying the UCI;

the priority of a PUSCH carrying the HARQ-ACK is higher than that of a PUSCH carrying at least one of RI/CRI and CQI/PMI;

the priority of a PUSCH carrying at least one of a broadband CQI/PMI is higher than that of a PUSCH carrying a narrowband CQI/PMI; and in the case that a type of the UCI carried is the same, the priority of a PUSCH corresponding to a small TTI length is higher than that of a PUSCH corresponding to a large TTI length.

Here, when the remaining PUSCHs contain UCI, the UCI is transmitted on the PUSCH having the top priority. All information or partial information of UCI of the remaining PUSCHs is transmitted on the PUSCH having the top priority.

When the information of the remaining PUSCHs carries UCI and if the UCI contains appointed information, the appointed information is transmitted on the PUSCH having the top priority. Here, the appointed information may include at least one of: HARQ-ACK; at least one of HARQ-ACK and RI/CRI; and at least one of HARQ-ACK, RI/CRI and a preset type of CQI/PMI.

For the above transmission mode, the UCI includes at least one of the HARQ-ACK, the RI/CRI, and the CQI/PMI. That is, the UCI information may include a combination of one or more of the HARQ-ACK, the RI/CRI and the CQI/PMI. If the UCI contains the HARQ-ACK, all information or partial information of the UCI includes the HARQ-ACK. If the UCI contains at least one of HARQ-ACK and RI/CRI, all information or partial information of the UCI includes at least one of the HARQ-ACK and the RI/CRI. If the UCI contains at least one of the HARQ-ACK, the RI/CRI and the preset type of CQI/PMI, all information or partial information of the UCI includes at least one of the HARQ-ACK, the RI/CRI, and the preset type of CQI/PMI.

Here, the transmitting all information or partial information of the UCI may include: when it is required to transmit a specified type of UCI, transmitting the specified type of UCI of the second PUSCH, wherein the specified type of UCI includes at least one of the HARQ-ACK, the RI/CRI, and the preset type of CQI/PMI. For example, in the case that the type of the required UCI is the HARQ-ACK, when the second PUSCH contains the HARQ-ACK, the HARQ-ACK is transmitted, and it is determined, based on other types of UCI required, whether to transmit the other types of UCI. When the second PUSCH does not contain the HARQ-ACK but contains the RI/CRI and the preset type of CQI/PMI, the required UCI is the HARQ-ACK. In this case, neither the HARQ-ACK nor other types of UCI may be transmitted.

In the above transmission mode, the appointed information may include at least one of: the HARQ-ACK; at least one of the HARQ-ACK and the RI/CRI; and at least one of the HARQ-ACK, the RI/CRI and the preset type of CQI/PMI.

Here, the preset type of CQI may be a broadband CQI, and the preset type of PMI may be a broadband PMI.

It is to be noted that according to the method for transmitting information provided by the embodiments of the present application, information may be transmitted based on the transmission mode preset in the transmitting terminal, or may be transmitted based on the transmission mode indicated by the base station. Furthermore, the transmission mode may be determined in combination with the transmission mode preset in the transmitting terminal and the transmission mode indicated by the base station. If the transmission mode is determined in combination with the transmission mode preset in the transmitting terminal and the transmission mode indicated by the base station, for example, when the transmission mode preset in the transmitting terminal is the deferred transmission in the transmission mode I, the base station may indicate which information or subframe is the transmission deferred to, such that the information transmission mode is determined based on the transmission mode configured in the transmitting terminal and the transmission mode indicated by the base station. For another example, the transmission mode indicated by the base station is a preset information transmission mode determined based on the priority of a PUSCH. The priority may be determined in the transmitting terminal.

As shown in FIG. 1, the method of this embodiment may include following steps.

In Step S102, a receiving terminal receives, on one carrier wave, information based on the transmission mode.

Here, the receiving terminal may be a base station. For example, when the base station receives the information transmitted from the transmitting terminal (for example, the UE), the base station can detect the TTI lengths corresponding to different PUSCHs and the agreed transmission time, and may receive information based on a receiving mode corresponding to the transmission mode used by the UE. Here, indication information may be carried when the UE is transmitting information, to indicate which transmission mode the UE uses to transmit the information, such that after receiving the information, the base station parses the received information according to the receiving mode corresponding to the indication information, to obtain information of different PUSCHs.

According to the method for transmitting information provided by the embodiments of the present application, when the agreed transmission time of two or more PUSCHs overlaps in one carrier wave, the final transmission mode is determined according to at least one of a preset transmission mode and a transmission mode indicated by a base station, and information of a plurality of PUSCHs with the agreed transmission time overlapped is transmitted, thereby effectively solving the problem of information transmission when the agreed transmission time of the PUSCHs overlaps. When the PUSCHs with the agreed transmission time overlapped have different TTIs, the PUSCH having the minimum TTI length is determined, and the information of this PUSCH is preferentially transmitted, thereby ensuring the delay validity of the PUSCH having shorter TTI. In the embodiments of the present application, when the information of a PUSCH having a larger TTI length is abandoned, only the data information thereof is abandoned. Control information such as UCI and DMRS of this PUSCH is combined with the information of the PUSCH with the smallest TTI length, and then the combined information is transmitted. In this way, real-time transmission of the information of the PUSCH is implemented without having a negative effect on the normal operation of the system.

FIG. 2 is a schematic flow diagram illustrating a method for receiving information according to an embodiment of this application. As shown in FIG. 2, the method of this embodiment includes following steps.

In Step S201, a transmitting terminal transmits information on one carrier wave.

In Step S202, a receiving terminal receives the information on one carrier wave according to at least one of a preset receiving mode and a receiving mode indicated by the eNB when agreed transmission time of two or more PUSCHs overlaps.

Here, the receiving terminal may be a base station, and the transmitting terminal may be a UE.

At least one of transmission time interval (TTI) lengths corresponding to the two or more PUSCHs is different, wherein the PUSCH corresponding to the minimum TTI length among the two or more PUSCHs is a first PUSCH, the PUSCH except the first PUSCH among the two or more PUSCHs is a second PUSCH, and the PUSCH corresponding to the subminimal TTI length among the two or more PUSCHs is a third PUSCH.

Here, the method of this embodiment may further include: determining a receiving mode according to the TTI lengths corresponding to the two or more PUSCHs.

The method of this embodiment may further include: determining a receiving mode according to the TTI length corresponding to the first PUSCH among the two or more PUSCHs.

A variety of receiving modes are described below.

Receiving Mode I

In the receiving mode I, the first PUSCH is received. Reception of the second PUSCH may be abandoned or deferred until after the agreed transmission time of the second PUSCH.

When information of the second PUSCH carries UCI, the UCI is received on the first PUSCH.

When the information of the second PUSCH carries UCI and if the UCI contains appointed information, the appointed information is received on the first PUSCH.

Receiving Mode II

In the receiving mode II, the third PUSCH is received. Reception of the PUSCH except the third PUSCH among the two or more PUSCHs may be abandoned or deferred until after the agreed transmission time.

In an interleaving matrix corresponding to the third PUSCH, the information of the first PUSCH is written into columns corresponding to all or a part of symbols corresponding to the first PUSCH in the interleaving matrix.

When the information of the third PUSCH contains UCI and a symbol corresponding to the first PUSCH overlaps with a symbol corresponding to the UCI, the information of the first PUSCH is written into the interleaving matrix while skipping a location corresponding to the UCI.

When the symbol corresponding to the first PUSCH overlaps with a symbol corresponding to HARQ-ACK of the third PUSCH and in the case that the third PUSCH contains HARQ-ACK information or the third PUSCH does not contain the HARQ-ACK information, the information of the first PUSCH is written into the interleaving matrix while skipping a location corresponding to the HARQ-ACK.

When the information of the third PUSCH contains first UCI and the symbol corresponding to the first PUSCH overlaps with a symbol corresponding to the UCI in the information of the third PUSCH, the information of the first PUSCH is written into the interleaving matrix while skipping the location corresponding to the first UCI in the information of the third PUSCH. The first UCI includes at least one of the RI/CRI and the CQI/PMI.

When the information of the third PUSCH contains the HARQ-ACK and the symbol corresponding to the first PUSCH overlaps with a symbol corresponding to the HARQ-ACK in the information of the third PUSCH, after the information of the first PUSCH is written into the interleaving matrix, the HARQ-ACK is written.

Here, resource allocation corresponding to the third PUSCH is the same as that corresponding to the first PUSCH.

In this receiving mode, when the third PUSCH contains two transport blocks and the first PUSCH contains one transport block, the transport block of the first PUSCH is received on the two transport blocks of the third PUSCH, and the transport block of the first PUSCH is retransmitted on the two transport blocks of the third PUSCH.

When the third PUSCH contains two transport blocks and the first PUSCH contains one transport block, the transport block of the first PUSCH is received on either transport block of the third PUSCH, and the transport block of the first PUSCH is transmitted on either transport block of the third PUSCH.

When the third PUSCH contains two transport blocks and the first PUSCH contains two transport blocks, a transport block of the first PUSCH is received on the two transport blocks of the third PUSCH, and the two transport blocks of the first PUSCH are transmitted on the two transport blocks of the third PUSCH respectively.

When the third PUSCH contains one transport block and the first PUSCH contains two transport blocks, a transport block of the first PUSCH is received on the transport block of the third PUSCH, and both the two transport blocks of the first PUSCH are transmitted on the transport block of the third PUSCH.

When receiving on one transport block of the third PUSCH, the number of transport layers for receiving the first PUSCH may be determined by one of:

downlink control information (DCI) for scheduling the first PUSCH; and retransmitting, when the number of the transport layers of the transport blocks of the third PUSCH is greater than 1 and the number of the transport layers of the transport blocks of the first PUSCH is equal to 1, the first PUSCH on all the transport layers of the transport blocks of the third PUSCH.

When the third PUSCH contains two transport blocks and the first PUSCH contains one transport block, the transport block of the first PUSCH is received on either transport block of the third PUSCH, wherein the transport block of the third PUSCH receiving the first PUSCH may be one of:

a transport block having a maximal modulation and coding scheme (MCS); and a preset transport block.

Receiving Mode II

In the receiving mode III, the first PUSCH is received on a symbol corresponding to the first PUSCH, and the third PUSCH is received on a symbol except the symbol corresponding to the first PUSCH among symbols corresponding to the third PUSCHs.

Reception of a fourth PUSCH may be abandoned or deferred until after the agreed transmission time of the fourth PUSCH, wherein the fourth PUSCH is a PUSCH except the first PUSCH and the third PUSCH among the two or more PUSCHs.

When at least one of the information of the third PUSCH and the information of the fourth PUSCH contains UCI, the UCI is received on the first PUSCH.

When at least one of the information of the third PUSCH and the information of the fourth PUSCH carries UCI and if the UCI contains appointed information, the appointed information is received on the first PUSCH.

The receiving mode may further include: receiving, when the third PUSCH contains UCI and a symbol corresponding to the UCI overlaps with a symbol corresponding to the first PUSCH, the UCI on the first PUSCH.

When the information of the third PUSCH carries UCI and if the UCI contains appointed information, the appointed information is received on the first PUSCH.

The receiving terminal does not send first DCI, and the first DCI schedules the transmitting terminal to transmit on an appointed symbol, wherein the appointed symbol includes at least one of:

a symbol corresponding to HARQ-ACK corresponding to at least one of the third PUSCH and the fourth PUSCH;

if at least one of the information of the third PUSCH and the information of the fourth PUSCH contains RI/CRI, the appointed symbol is a symbol corresponding to the RI/CRI; and if at least one of the information of the third PUSCH and the information of the fourth PUSCH contains CQI/PMI, the appointed symbol is a symbol corresponding to the CQI/PMI.

When the symbol corresponding to the first PUSCH overlaps with the symbol corresponding to a DMRS of the third PUSCH, the DMRS is generated based on a frequency domain span of the first PUSCH and the third PUSCH.

In an exemplary embodiment, only an appointed PUSCH is received on one transmission symbol, wherein the appointed PUSCH satisfies one of following conditions:

only the agreed transmission time of the appointed PUSCH among the two or more PUSCHs comprises the transmission symbol;

the agreed transmission time of a plurality of PUSCHs among the two or more PUSCHs includes the transmission symbol, and among the plurality of PUSCHs, the TTI length corresponding to the appointed PUSCH is the minimum; and the transmission symbol is one symbol in a set of symbols contained in the agreed transmission time of the two or more PUSCHs.

When the information of the second PUSCH contains UCI, the UCI is transmitted on the first PUSCH.

The receiving mode may further include: receiving, when the information of the second PUSCH carries UCI and if the UCI contains appointed information, the appointed information on the first PUSCH.

Receiving Mode IV

In the receiving mode IV, the two or more PUSCHs are received when frequency domain resources of the two or more PUSCHs do not overlap.

The DMRS is generated based on total frequency domain resources of the two or more PUSCHs.

Receiving Mode V

In the receiving mode V, a priority is determined based on at least one of a fact whether the two or more PUSCHs carry UCI and the UCI carried, it is selected to receive the PUSCH having a top priority, and reception of the remaining PUSCHs is abandoned or deferred until after the agreed transmission time of the remaining PUSCHs, wherein the remaining PUSCHs are PUSCHs except the PUSCH having the top priority among the two or more PUSCHs.

The determining a priority based on at least one of a fact whether the two or more PUSCHs carry UCI and the UCI carried may include at least one of:

the priority of a PUSCH carrying the UCI is higher than that of a PUSCH not carrying the UCI;

the priority of a PUSCH carrying the HARQ-ACK is higher than that of a PUSCH carrying at least one of RI/CRI and CQI/PMI;

the priority of a PUSCH carrying at least one of a broadband CQI/PMI is higher than that of a PUSCH carrying a narrowband CQI/PMI; and in the case that a type of the UCI carried is the same, the priority of a PUSCH corresponding to a small TTI length is higher than that of a PUSCH corresponding to a large TTI length.

When the remaining PUSCHs contain UCI, the UCI is received on the PUSCH having the top priority.

When information of the remaining PUSCHs carries UCI and if the UCI contains appointed information, the appointed information is received on the PUSCH having the top priority.

In the receiving mode provided by this embodiment, the UCI may include at least one of the HARQ-ACK, the RI/CRI, and the CQI/PMI.

The appointed information may include at least one of: the HARQ-ACK; at least one of the HARQ-ACK and the RI/CRI; and at least one of the HARQ-ACK, the RI/CRI and a preset type of CQI/PMI.

Here, the preset type of CQI may be a broadband CQI, and the preset type of PMI may be a broadband PMI.

The transmission mode I in the method for transmitting information provided by this embodiment is further described below.

When the transmission time of data having two TTI lengths overlaps, the lengths of the two TTIs are different. Here, the length of the TTI may be a 1 ms in a long term evolution (LTE) system, or the TTI includes 2 symbols or 4 symbols or 7 symbols, wherein the 2 symbols or the 4 symbols or the 7 symbols may be physically continuous or discontinuous. For example, when the TTI length is 2 symbols, the DMRS is transmitted on the first symbol of one subframe, and the uplink data are transmitted on the third symbol of the subframe. In practical applications, the length of a TTI is not limited. In this embodiment, a TTI less than 1 ms is also referred to as a short TTI (sTTI).

In this embodiment, reference is made in a scenario where the transmission time of a PUSCH having a 1 ms TTI overlaps with the transmission time of a PUSCH having an sTTI. The method in this embodiment may also be used for simultaneous transmission of two sTTIs, where the lengths of the two sTTIs are different. For example, one sTTI has a length of 4 symbols, whereas the other sTTI has a length of 2 symbols. In this embodiment, the PUSCH of 1 ms TTI is called a PUSCH, whereas the PUSCH of sTTI is called an sPUSCH. The sPUSCH is the first PUSCH, whose TTI length is shorter, whereas the PUSCH is the second PUSCH, whose TTI length is longer.

As shown in FIG. 3, a schematic diagram illustrating that transmission time of the PUSCH and transmission time of the sPUSCH overlap is provided. User Equipment (UE) detects an uplink grant in the subframe n, the UE will transmit the PUSCH in the subframe n+4, and in the subframe n+3, the UE receives an uplink grant scheduling the UE to transmit the sPUSCH on 2 symbols of the subframe n+4.

At this moment, the information of the sPUSCH and the information of the PUSCH may be transmitted by using the following two methods.

According to one method, the UE transmits the sPUSCH but abandons the transmission of the PUSCH.

In an exemplary embodiment, when the PUSCH includes UCI, all or a part of information of the UCI is transmitted on the sPUSCH. Here, the UCI includes at least one of: CQI, PMI, HARQ-ACK, RI, CRI, wherein the HARQ-ACK is feedback information of downlink data, such as 1 bit ACK/NACK (acknowledgement/non-acknowledgement message). The RI may be one of: only the RI, joint reporting of RI and i1, joint reporting of CRI (CSI-RS Resource Indication, CSI-RS (Channel State Information-Reference Signal) resource indication) and RI, joint reporting of CRI, RI and i1, joint reporting of CRI, RI, and PTI (Precoding Type Indicator), and joint reporting of RI and PTI. The i1 is a Wideband first PMI i1. In practical application, these pieces of information are not limited thereto.

Here, when the sPUSCH also includes the UCI, the UCI of the PUSCH and the UCI of the sPUSCH may be simultaneously transmitted in a cascade manner.

When the UCI of the PUSCH and the UCI on the sPUSCH are transmitted in a cascade manner, the UCI of the PUSCH and the UCI of the sPUSCH may be transmitted in a cascade manner according to the type of the UCI. For example, the HARQ-ACK on the sPUSCH and the HARQ-ACK on the PUSCH are first cascaded, and then are written into an interleaving matrix of the sPUSCH. Optionally, the RI of the sPUSCH and the RI on the PUSCH are first cascaded, and then are written into the interleaving matrix of the sPUSCH. Here, the cascading sequence may be preset, for example, the UCI of the sPUSCH precedes the UCI of the PUSCH. The UCI may be divided into HARQ-ACK, RI/CRI and CQI/PMI according to type.

When the PUSCH includes UCI, transmitting, on the sPUSCH, a part of information of the UCI includes at least one of:

if the UCI includes HARQ-ACK, transmitting the HARQ-ACK on the sPUSCH, and if the UCI further includes other information, abandoning the transmission of the other information;

if the UCI includes at least one of: HARQ-ACK, RI/CRI, transmitting at least one of the HARQ-ACK and the RI/CRI on the sPUSCH, and if the UCI further includes other information, abandoning the transmission of the other information; for example, when the UCI includes the HARQ-ACK, the RI/CRI and the CQI/PMI, both the HARQ-ACK and the RI/CRI may be transmitted on the sPUSCH, and the transmission of the CQI/PMI is abandoned; and if the UCI includes at least one of the HARQ-ACK, the RI/CRI and a preset type of CQI/PMI, transmitting at least one of the HARQ-ACK, the RI/CRI and the preset type of CQI/PMI on the sPUSCH, and abandoning the transmission of the other information. Herein, the preset type of CQI/PMI may be CQI/PMI of some formats, such as wideband CQI/PMI. For example, when the UCI includes the HARQ-ACK, the RI/CRI and narrowband CQI/PMI, the HARQ-ACK and the RI/CRI may be transmitted on the sPUSCH, and the transmission of the narrowband CQI/PMI may be abandoned. In the following embodiments, description of the preset type of CQI/PMI is similar to that here.

According to another transmission method when the transmission time of the PUSCH overlaps with that of the sPUSCH, the transmission of the PUSCH is deferred. For example, the transmission of the PUSCH is deferred to the first subframe in which neither the PUSCH nor the sPUSCH is transmitted. For example, in FIG. 3, when neither the PUSCH nor the sPUSCH is transmitted in the subframe n+5, the deferred PUSCH is transmitted in the subframe n+5. If at least one of the PUSCH and the sPUSCH is to be transmitted in the subframe n+5, the transmission is further deferred until there is no subframe in which at least one of the PUSCH and the sPUSCH is to be transmitted. In an exemplary embodiment, the UCI of the deferred PUSCH may be transmitted on the sPUSCH, similar to the mode described above.

In practical applications, when the transmission time of at least two PUSCHs of TTI lengths overlaps, i.e., when at least one symbol in the at least two PUSCHs of TTI lengths is the same, the above method may be similarly used. FIG. 4 is a schematic diagram illustrating that the transmission time of three PUSCHs of TTI lengths overlaps. The three PUSCHs have different TTI lengths, i.e., 1 ms, 4 symbols and 2 symbols respectively. Overlapping symbols of the three PUSCHs are symbols #4 and #5, and the sloped portion represents a DMRS symbol.

In this case, to ensure the delay performance of the sPUSCH having the shortest TTI length, the sPUSCH having the shortest TTI length should be transmitted, while the transmission of other PUSCHs and sPUSCHs is abandoned, and the processing mode of the UCI is the same as the processing mode described above.

In practical applications, the method provided in this embodiment is not limited to use for PUSCH, and may also be used for other channels.

The transmission mode II in the method for transmitting information provided by this embodiment is further described below.

Similar to the embodiment corresponding to FIG. 1, this embodiment provides a transmission method when the transmission time of two types of data having TTI length overlaps. Specifically, reference is made using a scenario where the transmission time of the PUSCH having 1 ms TTI overlaps with that of the PUSCH having sTTI. In this embodiment, the PUSCH having 1 ms TTI is called a PUSCH, which is the third PUSCH, whereas the PUSCH having sTTI is called an sPUSCH, which is the first PUSCH.

In this embodiment, the resource allocation in the uplink grant scheduling the sPUSCH should be the same as the resource allocation in the uplink grant scheduling the PUSCH.

The sPUSCH is punctured and transmitted on the PUSCH. Herein, the puncturing and transmitting mean that the information of the sPUSCH is punctured and transmitted on an interleaving matrix of the PUSCH before the discrete Fourier transform (DFT) operation. Optionally, the information of the sPUSCH overwrites, in the interleaving matrix, a part of information of the PUSCH.

For example, the transmission time corresponding to the PUSCH is the subframe n, and the transmission time corresponding to the sPUSCH is the first two symbols of the subframe n. In the interleaving matrix of the PUSCH, the columns corresponding to the first two symbols are overwritten by the information of the sPUSCH. For example, the interleaving matrix of the PUSCH is $(R_{mux} \times C_{mux})$, $R_{mux}$ represents the number of rows, and $C_{mux}$ represents the number of columns. As shown below, each element $\underline{y}_i$ (i represents an integer, and $0 \leq i \leq (R'_{mux} \times C_{mux} - 1)$) in the matrix represents a vector of one column and $(Q_m \cdot N_L)$ rows. $R'_{mux} = R_{mux}/(Q_m \cdot N_L)$, wherein $Q_m$ represents the modulation order, $N_L$ represents the number of layers. $C_{mux} = N_{symb}^{PUSCH}$ presents the number of symbols transmitted by the PUSCH, not including a symbol for transmitting the DMRS. If there is a sounding reference signal (SRS), no symbol for transmitting the SRS is included.

$$\begin{bmatrix} \underline{y}_0 & \underline{y}_1 & \underline{y}_2 & \cdots & \underline{y}_{C_{mux}-1} \\ \underline{y}_{C_{mux}} & \underline{y}_{C_{mux}+1} & \underline{y}_{C_{mux}+2} & \cdots & \underline{y}_{2C_{mux}-1} \\ \vdots & \vdots & \vdots & \ddots & \vdots \\ \underline{y}_{(R'_{mux}-1) \times C_{mux}} & \underline{y}_{(R'_{mux}-1) \times C_{mux}+1} & \underline{y}_{(R'_{mux}-1) \times C_{mux}+2} & \cdots & \underline{y}_{(R'_{mux} \times C_{mux}-1)} \end{bmatrix}$$

Figure 5:
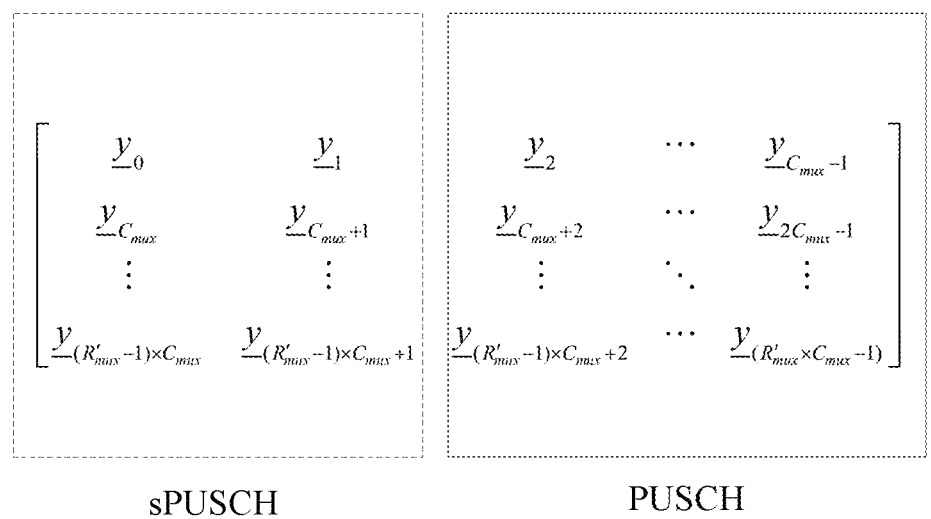
FIG. 5 is a schematic diagram illustrating a punched matrix according to an embodiment of the present application.

Since the sPUSCH occupies the first two symbols, the sPUSCH overwrites the information of the PUSCH on the columns corresponding to the first two symbols in the interleaving matrix, i.e., overwrites the first two columns. As shown in FIG. 5, the first two columns are information of the sPUSCH, and the remaining columns are information of the PUSCH itself. In an exemplary embodiment, the manner of writing the sPUSCH may be preset. For example, the sPUSCH is written from the first row downward, column taking precedence over row. Optionally, the sPUSCH is written from the first column rightward, row taking precedence over column.

Here, when a symbol corresponding to the sPUSCH includes a symbol corresponding to the DMRS of the PUSCH, the DMRS of the PUSCH is still transmitted on this symbol, and the DMRS of the PUSCH is not overwritten.

In this embodiment, the number of transport blocks in the uplink grant scheduling the sPUSCH may be equal to that in the uplink grant scheduling the PUSCH. Each transport block in the uplink grant scheduling the sPUSCH and each transport block in the uplink grant scheduling the PUSCH includes equal number of layers.

In this embodiment, the number of transport blocks in the uplink grant scheduling the sPUSCH may be not equal to the number of transport blocks in the uplink grant scheduling the PUSCH. However, they have one transport block corresponding to the same number of layers. For example, the sPUSCH includes one transport block, and this transport block corresponds to two layers; whereas the PUSCH includes two transport blocks, wherein one transport block corresponds to two layers, and the other transport block corresponds to one layer.

In this embodiment, the modulation and coding scheme (MCS) in the uplink grant scheduling the sPUSCH may be the same as that in the uplink grant scheduling the PUSCH. For example, both the sPUSCH and the PUSCH include two transport blocks, and the two transport blocks have the same MCS. Optionally, the sPUSCH includes one transport block, the PUSCH includes two transport blocks, and the transport block of the sPUSCH and either transport block of the PUSCH have the same MCS.

In this embodiment, when the PUSCH includes two transport blocks and the sPUSCH includes one transport block, the transport block of the sPUSCH is retransmitted on the two transport blocks of the PUSCH. When the PUSCH includes two transport blocks and the sPUSCH includes one transport block, the transport block of the sPUSCH is transmitted on either transport block of the PUSCH. Exemplarily, the sPUSCH is transmitted on the transport block having a supreme MCS. Optionally, the sPUSCH is transmitted on the preset transport block. For example, the transport block of the sPUSCH is transmitted on the first transport block of the PUSCH. When the PUSCH includes two transport blocks and the sPUSCH includes two transport blocks, the two transport blocks of the sPUSCH are respectively transmitted on the two transport blocks of the PUSCH. When the PUSCH includes one transport block and the sPUSCH includes two transport blocks, both the two transport blocks of the sPUSCH are transmitted on the transport block of the PUSCH.

Exemplarily, when the two transport blocks of the sPUSCH are transmitted on the transport block of the PUSCH, the two transport blocks of the sPUSCH may be transmitted on all layers or a part of the layers corresponding to the transport block. For example, the number of layers transmitted by the sPUSCH is determined by the DCI scheduling the sPUSCH. For example, one transport block of the PUSCH corresponds to four layers, the DCI scheduling the sPUSCH informs one transport block of the sPUSCH to correspond to two layers, and the sPUSCH only transmits two layers. For another example, when the number of layers of the transport block of the PUSCH is greater than 1 and the number of layers of the transport block of the sPUSCH is equal to 1, the sPUSCH is retransmitted on all the layers of the transport block of the PUSCH.

Here, when the PUSCH includes UCI, the UCI includes at least one of the HARQ-ARQ, the RI/CRI and the CQI/PMI. The information of the sPUSCH does not overwrite a part of or all of information of the UCI of the PUSCH, i.e., the information of the PUSCH is overwritten outside a part of or all of the information of the UCI.

Exemplarily, if the UCI includes HARQ-ACK, the HARQ-ACK is skipped when writing the information of the sPUSCH into the interleaving matrix. If the UCI also includes other information, the other information of the UCI may be overwritten.

Exemplarily, if the UCI includes at least one of HARQ-ARQ and RI/CRI, at least one of the HARQ-ARQ and the RI/CRI is skipped when writing the information of the sPUSCH into the interleaving matrix. If the UCI also includes other information, the other information of the UCI may be overwritten.

Exemplarily, if the UCI includes at least one of HARQ-ARQ, RI/CRI and a preset type of CQI/PMI, at least one of the HARQ-ARQ, the RI/CRI and the preset type of CQI/PMI is skipped when writing the information of the sPUSCH into the interleaving matrix, and is transmitted on the sPUSCH. If the UCI also includes other information, the other information of the UCI may be overwritten.

It is to be noted that even though the information of the UCI does not include HARQ-ACK, the sPUSCH does not overwrite the location of the HARQ-ACK in the interleaving matrix, instead the sPUSCH skips the location of the HARQ-ACK, lest the eNB confuses about the location of the sPUSCH in the interleaving matrix when the UE misses detection of the PDCCH.

Optionally, when the information of the PUSCH contains first UCI, and a symbol corresponding to the sPUSCH overlaps with a symbol corresponding to the UCI in the information of the PUSCH, a location corresponding to partial information or all information of the UCI in the information of the PUSCH is skipped when writing the information of the sPUSCH into the interleaving matrix. The first UCI includes at least one of RI/CRI and CQI/PMI. For example, only the location corresponding to the RI/CRI is skipped.

When the information of the PUSCH contains HARQ-ACK and the symbol corresponding to the sPUSCH overlaps with the symbol corresponding to the HARQ-ACK in the information of the PUSCH, the information of the PUSCH is first written, and then the HARQ-ACK is written.

For example, when the PUSCH includes the RI and the HARQ-ARQ, symbols written by the sPUSCH also include symbols corresponding to the RI and the HARQ-ARQ. In this case, the symbols corresponding to the sPUSCH may be written in the following order. First, the information of the RI and the information of the PUSCH are written, next, the information of the sPUSCH is written in a preset manner, for example, the information of the sPUSCH is written down from the first line, and finally, the HARQ-ARQ is punctured and written at the corresponding location, i.e., the information originally written into the interleaving matrix is overwritten.

Exemplarily, when the PUSCH includes UCI and the symbol corresponding to the sPUSCH overlaps with the symbol corresponding to the UCI, the sPUSCH is deferred to a location not conflicting with the UCI of the PUSCH. For example, the sPUSCH is deferred to a next sTTI.

When a symbol corresponding to the sPUSCH does not overlap with a symbol corresponding to a DMRS of the PUSCH, only the DMRS corresponding to the PUSCH is transmitted in this subframe. When the symbol corresponding to the sPUSCH overlaps with the symbol corresponding to the DMRS of the PUSCH, the DMRS of the PUSCH is still transmitted on the symbol corresponding to the DMRS of the PUSCH. The sPUSCH is transmitted only on symbols corresponding to other sPUSCHs other than the symbol corresponding to the DMRS.

When the transmission time of at least two PUSCHs of TTI lengths overlaps, the above method may also be similarly employed. To ensure the delay performance of the sPUSCH having a shorter TTI length, two PUSCHs having the shortest TTI length are processed in the mode described above. For example, in FIG. 4, the sPUSCH having two symbols and the sPUSCH having four symbols are processed according to the method in this embodiment.

The transmission mode III in the method for transmitting information provided by this embodiment is further described below.

Similar to the embodiment as shown in FIG. 1, this embodiment provides a transmission method when the transmission time of two types of data having TTI length overlaps. Specifically, in this embodiment, reference is made using a scenario where the transmission time of the PUSCH having 1 ms TTI overlaps with that of the PUSCH having sTTI. In this embodiment, the PUSCH having 1 ms TTI is called a PUSCH, which is the third PUSCH, whereas the PUSCH having sTTI is called an sPUSCH, which is the first PUSCH.

Figure 6:
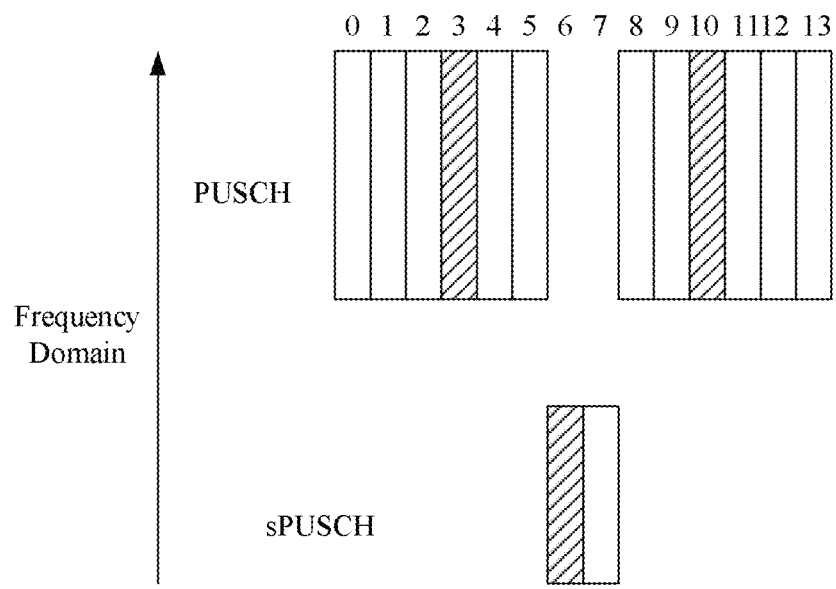
FIG. 6 is a schematic diagram illustrating that agreed transmission time of two PUSCHs overlaps according to an embodiment of the present application.

In this embodiment, only the information of the sPUSCH is transmitted on the symbol corresponding to the sPUSCH, whereas the information of the PUSCH is not transmitted, but the information of the PUSCH is still transmitted on the remaining symbols corresponding to the PUSCH. As shown in FIG. 6, the PUSCH in FIG. 6 is 14 symbols in one subframe, where the sPUSCH occupies symbols #6 and 7, and the sloped portion represents a DMRS. In this method, frequency domain resources corresponding to the sPUSCH and the PUSCH may be overlapped, or not overlapped or partially overlapped.

To avoid having a negative effect on at least one of the DMRS and the UCI corresponding to the PUSCH, it may be specified that the sPUSCH is not allowed to be transmitted on a symbol corresponding to a part of or all of information of the UCI. That is, the UE does not expect to receive such an uplink grant scheduling the UE to transmit the sPUSCH on a symbol including at least one of the UCI and the DMRS. Here, the symbol corresponding to a part of or all of information of the UCI includes at least one of: a symbol corresponding to the HARQ-ACK corresponding to the PUSCH no matter whether there is the HARQ-ACK on the PUSCH to avoid that the eNB and the UE have different understanding caused by not transmitting the HARQ-ACK due to missing detection of a control channel; a symbol corresponding to RI/CRI if the PUSCH includes the RI/CRI; and a symbol corresponding to CQI/PMI if the PUSCH includes the CQI/PMI.

Optionally, when the PUSCH includes the UCI, the UCI may be transmitted by one of the following methods.

Mode I:
Regardless of the location of the sPUSCH, when the PUSCH includes the UCI, all or a part of the information of the UCI is transmitted on the sPUSCH.

Transmitting all or a part of the information of the UCI on sPUSCH includes:

transmitting the HARQ-ACK on the sPUSCH if the UCI includes the HARQ-ACK, and abandoning transmission of other information if the UCI further includes the other information;

transmitting at least one of HARQ-ACK and RI/CRI on the sPUSCH if the UCI includes at least one of the HARQ-ACK and the RI/CRI, and abandoning transmission of other information if the UCI further includes the other information; and transmitting at least one of HARQ-ACK, RI/CRI and a preset type of CQI/PMI on the sPUSCH if the UCI includes at least one of the HARQ-ACK, the RI/CRI and the preset type of CQI/PM, and abandoning transmission of other information.

Description of transmitting all or a part of information of the UCI on the sPUSCH mentioned below is similar to the description here.

Figure 7:
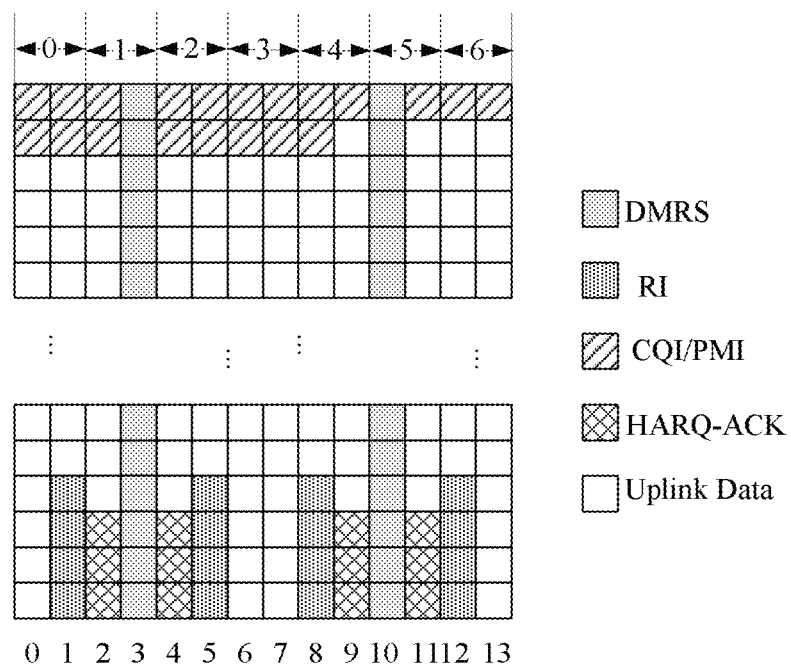
FIG. 7 is a schematic diagram illustrating characters when a rank indication (RI) overlaps according to an embodiment of the present application.

Mode II:
When the PUSCH includes the UCI and the symbol corresponding to the sPUSCH overlaps with the symbol corresponding to the UCI, all or a part of the information of the overlapped portion of the UCI is transmitted on the sPUSCH. Here, the overlapped symbols means that a part of the symbols are the same. For example, if at least one of the HARQ-ACK and channel state information (CSI) overlaps, at least one of the HARQ-ACK and the CSI is transmitted on the sPUSCH. When the UCI is not overlapped, the UCI is still transmitted on the PUSCH. As shown in FIG. 7, when the sPUSCH corresponds to the first two symbols, RI is transmitted on the PUSCH if exactly the RI is to be transmitted on the PUSCH. Description of all or a part of the information of the overlapped portion of the UCI is similar to Mode I.

Mode III:
When the symbol corresponding to the sPUSCH overlaps with the symbol corresponding to all or a part of the information of the UCI, the sPUSCH is still transmitted on the overlapped symbol.

Mode IV:
When the symbol corresponding to the sPUSCH overlaps with the symbol corresponding to all or a part of the information of the UCI, the sPUSCH is deferred to a location not conflicting with the UCI. For example, the sPUSCH is deferred to a next sTTI without UCI information.

When the symbol corresponding to the sPUSCH overlaps with the symbol corresponding to the DMRS of the PUSCH, the sPUSCH may be transmitted in one of the following modes.

Mode I:
The sPUSCH is transmitted on the symbol corresponding to the DMRS, and the PUSCH may be demodulated using the DMRS on the other remaining symbols. For example, if the sPUSCH is in the first time slot, the PUSCH may be demodulated by using the DMRS in the second time slot.

Figure 8:
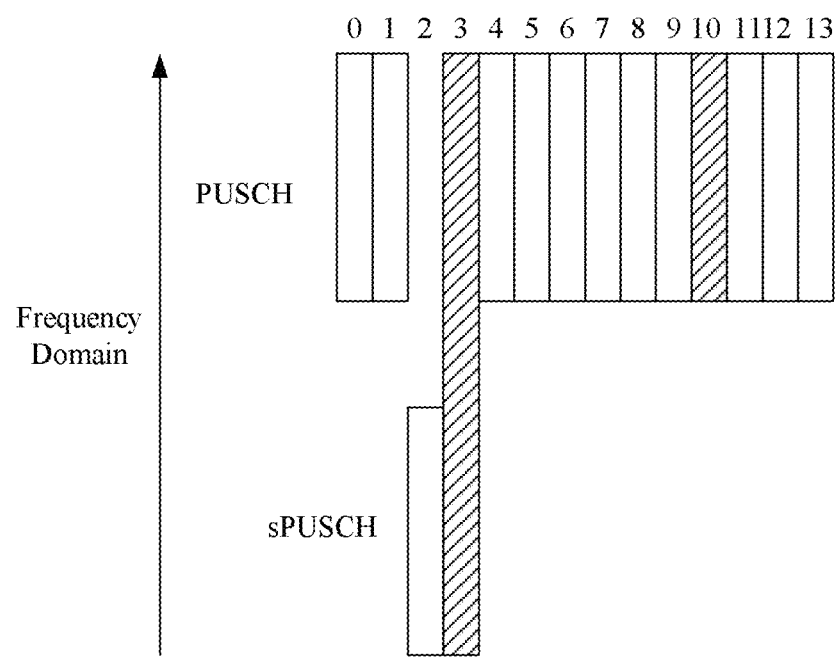
FIG. 8 is a schematic diagram illustrating characters when a demodulation reference signal (DMRS) overlaps according to an embodiment of the present application.

Mode II:
One DMRS is generated according to a frequency domain span between the sPUSCH and the PUSCH. As shown in FIG. 8, symbols corresponding to the sPUSCH are symbols #2 and 3, and overlap with a DMRS symbol of the first time slot of the PUSCH. At this moment, one DMRS is generated according to the frequency domain span between the PUSCH and the sPUSCH, i.e., one DMRS is generated from the lowest frequency to the highest frequency of the PUSCH and the sPUSCH. A time domain location of the DMRS may be a symbol corresponding to the DMRS of the PUSCH, or may be a symbol corresponding to the DMRS of the sPUSCH. The time domain location of the DMRS in FIG. 8 is a symbol corresponding to the DMRS.

When the transmission time of at least two PUSCHs of TTI lengths overlaps, the above method may also be similarly employed. To ensure the delay performance of the sPUSCH having a shorter TTI length, two PUSCHs having the shortest TTI length are processed in the mode described above. For other PUSCHs, abandoning or deferring transmission is adopted. Here, reference is made to the description of the embodiment in the transmission mode I for specific details of abandoning or deferring the transmission. When other PUSCHs include UCI, a part of or all of information of the UCI may be transmitted on the sPUSCH. For example, in FIG. 3, the sPUSCH having two symbols and the sPUSCH having four symbols are processed according to the method in this embodiment.

Here, when the transmission time of at least two PUSCHs of TTI length overlaps, only an appointed PUSCH is transmitted on one transmission symbol, wherein the appointed PUSCH satisfies one of following conditions: only the agreed transmission time of the appointed PUSCH among the two or more PUSCHs includes the transmission symbol; the agreed transmission time of a plurality of PUSCHs among the two or more PUSCHs includes the transmission symbol, and among the plurality of PUSCHs, the TTI length corresponding to the appointed PUSCH is the minimum.

Figure 9:
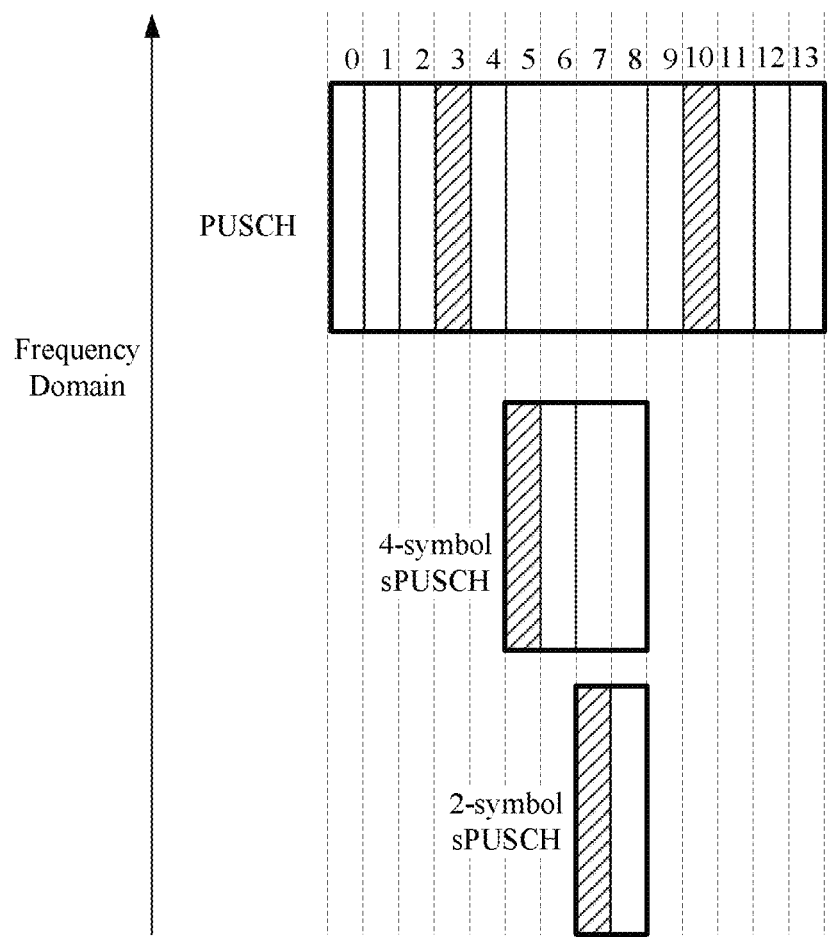
FIG. 9 is a schematic diagram illustrating that agreed transmission time of three PUSCHs overlaps according to an embodiment of the present application.

As shown in FIG. 9, the agreed transmission time of three PUSCHs of TTI length overlaps, i.e., 1 ms PUSCH, 4-symbol sPUSCH, and 2-symbol sPUSCH. The agreed transmission time of the 1 ms PUSCH is symbols 0 to 13. The agreed transmission time of the PUSCH of the 4-symbol sPUSCH is symbols 5 to 8. The agreed transmission time of the 2-symbol sPUSCH is symbols 7 and 8. In this case, on the symbols 7 and symbol 8, the TTI length of the 2-symbol sPUSCH is the smallest, and only the 2-symbol sPUSCH is transmitted. On the symbols #5 and 6, the TTI length of the 4-symbol sPUSCH is the smallest, and only the 4-symbol sPUSCH is transmitted. On the remaining symbols, i.e., the symbols #0 to 4 and the symbols 9 to 13, only the agreed transmission time of the 1 ms PUSCH includes the symbol, and only the 1 ms PUSCH is transmitted.

When the information of the second PUSCH carries UCI, a part of or all of the information of the UCI is transmitted on the first PUSCH. The first PUSCH is a PUSCH corresponding to the minimum TTI length among the PUSCHs whose agreed transmission time overlaps, the second PUSCH is a PUSCH except the first PUSCH among the PUSCHs whose agreed transmission time overlaps. Similar to the above example, the 4-symbol sPUSCH and the 1 ms PUSCH are the second PUSCHs, and the 2-symbol sPUSCH is the first PUSCH. When the 4-symbol sPUSCH and the 1 ms PUSCH carry UCI, a part of or all of the information of the UCI carried is transmitted on the 2-symbol PUSCH.

The transmission mode IV in the method for transmitting information provided by this embodiment is further described below.

Similar to the embodiment as shown in FIG. 1, this embodiment provides a transmission method when the transmission time of two types of data of TTI length overlaps. Specifically, in this embodiment, reference is made using a scenario where the transmission time of the PUSCH having 1 ms TTI overlaps with that of the PUSCH having sTTI. In this embodiment, the PUSCH having 1 ms TTI is called a PUSCH, which is the third PUSCH, whereas the PUSCH having sTTI is called an sPUSCH, which is the first PUSCH.

In this embodiment, when frequency domain locations corresponding to the sPUSCH and the PUSCH do not overlap, the sPUSCH and the PUSCH are simultaneously transmitted, and the information of the sPUSCH and the information of the PUSCH are simultaneously transmitted.

When the sPUSCH overlaps with the DMRS of the PUSCH, a DMRS sequence may be generated based on total frequency domain resources corresponding to the sPUSCH and the PUSCH, and then the DMRS sequence is respectively mapped to the total frequency domain resources corresponding to the sPUSCH and the PUSCH in one symbol. For example, the PUSCH corresponds to physical resource blocks (PRBs) #1 to 6, 6 PRBs in total, the sPUSCH corresponds to PRBs #11 to 20, 10 PRBs in total, and the DMRS sequence is generated on 16 PRBs, and then is respectively mapped to PRBs #1 to 6 and PRBs 11 to 20. The symbol corresponding to the DMRS may be preset or may be indicated by an eNB, for example, a symbol corresponding to the DMRS of the sPUSCH, or a symbol corresponding to the DMRS of the PUSCH, or the first symbol of the sPUSCH. A cyclic shift corresponding to the DMRS may be preset or may be indicated by the eNB. For example, the cyclic shift is indicated by the DCI corresponding to the sPUSCH, or is indicated by the DCI corresponding to the PUSCH.

Optionally, when the DMRS of the sPUSCH overlaps with the DMRS of the PUSCH, the DMRS of the sPUSCH and the DMRS of the PUSCH are respectively transmitted within respective frequency domain ranges.

In this embodiment, on the symbol corresponding to the sPUSCH, data of the sPUSCH and data of the PUSCH may be generated by one DFT, the size of the DFT is determined by the total frequency domain resources of the sPUSCH and the PUSCH. For example, if the sPUSCH occupies 2 PRBs and the PUSCH occupies 3 PRBs, the size of the DFT is (2+3)×12=60. The value of the DFT is mapped to a subcarrier corresponding to the sPUSCH and a subcarrier corresponding to the PUSCH, and then an inverse fast fourier transform (IFFT) is performed. Optionally, the sPUSCH and the PUSCH are respectively generated by using one DFT. For example, in the above example, the DFT of the sPUSCH has a size of 2×12=24, and the DFT of the PUSCH has a size of 3×12=36. A signal generated by the DFT of the sPUSCH is mapped onto a subcarrier corresponding to the sPUSCH, and a signal generated by the DFT of the PUSCH is mapped onto a subcarrier corresponding to the PUSCH.

When the agreed transmission time of at least two PUSCHs of TTI length overlaps and the frequency domain resources of all the PUSCHs do not overlap, the above method may also be used for transmission, and the mode of generating the DMRSs is similar.

The transmission mode V in the method for transmitting information provided by this embodiment is further described below.

Similar to the embodiment as shown in FIG. 1, this embodiment provides a transmission method when the agreed transmission time of two types of data of TTI length overlaps. Specifically, in this embodiment, reference is made using a scenario where the transmission time of the PUSCH having 1 ms TTI overlaps with that of the PUSCH having sTTI. In this embodiment, the PUSCH having 1 ms TTI is called a PUSCH, which is the third PUSCH, whereas the PUSCH having sTTI is called an sPUSCH, which is the first PUSCH. The method in this embodiment is also used when the transmission time of at least two types of data of TTI length overlaps.

The transmission priority is determined according to the UCI carried by the sPUSCH and the UCI carried by the PUSCH. Here, when determining the priority, at least one of the following methods may be employed.

The priority of an sPUSCH/PUSCH carrying a UCI is higher than that of an sPUSCH/PUSCH not carrying the UCI. That is, if the sPUSCH carries the UCI whereas the PUSCH does not carry the UCI, the sPUSCH is transmitted, whereas transmission of the PUSCH is abandoned. Instead, if the PUSCH carries the UCI whereas the sPUSCH does not carry the UCI, the PUSCH is transmitted, whereas transmission of the sPUSCH is abandoned.

The priority of an sPUSCH/PUSCH carrying an HARQ-ACK is higher than that of an sPUSCH/PUSCH carrying at least one of RI/CRI and CQI/PMI. That is, if the sPUSCH carries the HARQ-ACK whereas the PUSCH does not carry the HARQ-ACK, the sPUSCH is transmitted, whereas transmission of the PUSCH is abandoned.

The priority of a PUSCH carrying a broadband CQI/PMI is higher than that of a PUSCH carrying a narrowband CQI/PMI.

In the case that the type of the UCI carried by the sPUSCH is the same as that carried by the PUSCH, the priority of the sPUSCH is higher than that of the PUSCH. That is, the sPUSCH is preferentially transmitted, whereas transmission of the PUSCH is abandoned.

When both the sPUSCH and the PUCCH carry the HARQ-ACK, the HARQ-ACK carried by the PUSCH is cascaded with the HARQ-ACK carried on the sPUSCH and then transmitted on the sPUSCH.

It is to be noted that the method for setting a priority and for transmitting information of PUSCH according to the priority in this embodiment may be used when the TTI length of the PUSCH is the same.

When the transmission time of at least two PUSCHs of TTI lengths overlaps, the above method may be similarly used for determining the priority.

In an exemplary embodiment of the method for transmitting information provided in the present application, it is provided a transmission method when the agreed transmission time of two types of data of TTI length overlaps. Specifically, in this embodiment, reference is made using a scenario where the transmission time of a PUSCH of 1 ms TTI overlaps with that of a PUSCH of sTTI. In this embodiment, the PUSCH of 1 ms TTI is called a PUSCH, whereas the PUSCH of sTTI is called an sPUSCH, and the sPUSCH is the first PUSCH. The method in this embodiment is also used when the transmission time of at least two types of data of TTI length overlaps.

In this embodiment, the transmission mode is determined according to the TTI length corresponding to the first PUSCH among the two or more PUSCHs, wherein different transmission methods adopted are determined according to the number of time domain symbols of the sPUSCH. For example, when the number of time domain symbols of the sPUSCH is seven, the method according to the transmission mode V in the above embodiment is used for transmission. When the number of time domain symbols of the sPUSCH is less than 7, the method according to the transmission mode II in the above embodiment is used for transmission. In practical application, the aforementioned examples are not limited thereto. The corresponding transmission mode may be determined according to the data of the TTI length of the two or more PUSCHs, and it may be determined that one length range corresponds to one transmission mode. When the range of the TTI length of the first PUSCH is determined, the transmission mode corresponding to this PUSCH is determined. For example, when the agreed transmission time of a 1 ms PUSCH overlapping with that of a 2-symbol PUSCH corresponds to one transmission mode, the agreed transmission time of a 2-symbol PUSCH overlapping with that of a 4-symbol PUSCH corresponds to another transmission mode.

In an exemplary embodiment of the method for transmitting information provided in the present application, similar to the embodiment as shown in FIG. 1, this embodiment provides a transmission method when the agreed transmission time of two types of data of TTI length overlaps. Specifically, in this embodiment, reference is made using a scenario where the transmission time of a PUSCH of 1 ms TTI overlaps with that of a PUSCH of sTTI. In this embodiment, the PUSCH of 1 ms TTI is called a PUSCH, whereas the PUSCH of sTTI is called an sPUSCH. The method in this embodiment is also used when the transmission time of at least two types of data of TTI length overlaps.

When the frequency domain resources of the PUSCH overlap with those of the sPUSCH, in a symbol corresponding to the sPUSCH, a column corresponding to the symbol corresponding to the sPUSCH in the interleaving matrix of the PUSCH is extracted to generate an interleaving matrix P1 of R1 rows and L columns. An interleaving matrix P2 of R2 rows and L columns is generated for the sPUSCH according to resources allocated by the sPUSCH. The UE generates a larger interleaving matrix P of R rows and L columns according to the total frequency domain resources corresponding to the PUSCH and the sPUSCH, where R>R1 and R2. The UE writes P1 from the first row of P, i.e., P1 is written into the first R1 rows of P. Next, P2 is written from the last row of P, i.e., P2 is written into the last R2 rows of P. if the information of the PUSCH is encountered, the information of the PUSCH is overwritten. The interleaving matrix is read out in columns for subsequent DFT and IFFT processing. Exemplarily, on the symbol corresponding to the sPUSCH, if the PUSCH includes a DMRS, a new DMRS is generated at the location corresponding to the DMRS. The frequency domain resources occupied by the new DMRS are the total frequency domain resources corresponding to the PUSCH and the sPUSCH.

Figure 10:
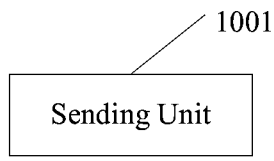
FIG. 10 is a block diagram illustrating an apparatus for transmitting information according to an embodiment of the present application.

FIG. 10 is a block diagram illustrating an apparatus for transmitting information according to an embodiment of the present application. This embodiment provides an apparatus for transmitting information, which is applied to a transmitting terminal. As shown in FIG. 10, the apparatus includes: a sending unit 1001, which is configured to transmit on one carrier wave according to at least one of a preset transmission mode and a transmission mode indicated by an eNB when agreed transmission time of two or more PUSCHs overlaps.

At least one of transmission time interval (TTI) lengths corresponding to the two or more PUSCHs is different, wherein the PUSCH corresponding to the minimum TTI length among the two or more PUSCHs is a first PUSCH, the PUSCH except the first PUSCH among the two or more PUSCHs is a second PUSCH, and the PUSCH corresponding to the subminimal TTI length among the two or more PUSCHs is a third PUSCH.

Figure 11:
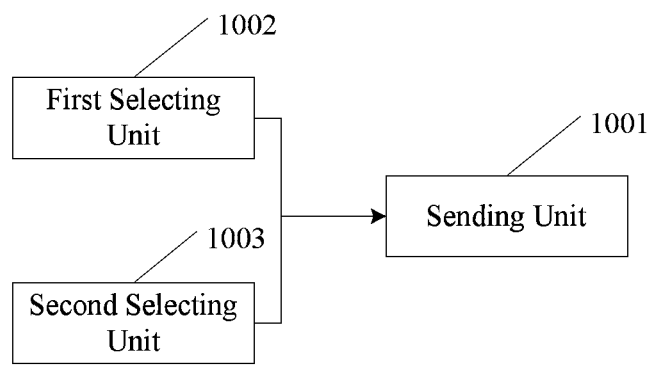
FIG. 11 is a block diagram illustrating another apparatus for transmitting information according to an embodiment of the present application.

As shown in FIG. 11, the apparatus of this embodiment may further include: a first selecting unit 1002, configured to determine a transmission mode according to the TTI lengths corresponding to the two or more PUSCHs.

As shown in FIG. 11, the apparatus of this embodiment may further include: a second selecting unit 1003, configured to determine a transmission mode according to the TTI length corresponding to the first PUSCH among the two or more PUSCHs.

The transmission modes of the apparatus for transmitting information provided by this embodiment may include following transmission modes.

Transmission Mode I

In the transmission mode I, the first PUSCH is transmitted.

Transmission of the second PUSCH may be abandoned or deferred until after the agreed transmission time of the second PUSCH.

When information of the second PUSCH carries uplink control information (UCI), the UCI is transmitted on the first PUSCH.

When the information of the second PUSCH carries UCI and if the UCI contains appointed information, the appointed information is transmitted on the first PUSCH.

Transmission Mode II

In the transmission mode II, the third PUSCH is transmitted.

Here, transmission of the PUSCH except the third PUSCH among the two or more PUSCHs is abandoned or deferred until after the agreed transmission time.

In an interleaving matrix corresponding to the third PUSCH, information of the first PUSCH is written into columns corresponding to all or a part of symbols corresponding to the first PUSCH in the interleaving matrix.

When information of the third PUSCH contains UCI and the symbol corresponding to the first PUSCH overlaps with a symbol corresponding to the UCI, a location corresponding to the UCI is skipped when writing the information of the first PUSCH into the interleaving matrix.

When the symbol corresponding to the first PUSCH overlaps with a symbol corresponding to HARQ-ACK of the third PUSCH and in the case that the third PUSCH contains HARQ-ACK information or the third PUSCH does not contain the HARQ-ACK information, a location corresponding to the HARQ-ACK is skipped when writing the information of the first PUSCH into the interleaving matrix.

When the information of the third PUSCH contains first UCI and the symbol corresponding to the first PUSCH overlaps with a symbol corresponding to the UCI in the information of the third PUSCH, a location corresponding to the first UCI in the information of the third PUSCH is skipped when writing the information of the first PUSCH into the interleaving matrix. The first PUSCH includes at least one of RI/CRI and CQI/PMI.

When the information of the third PUSCH contains HARQ-ACK and the symbol corresponding to the first PUSCH overlaps with a symbol corresponding to the HARQ-ACK in the information of the third PUSCH, the information of the first PUSCH is written into the interleaving matrix, and then the HARQ-ACK is written.

Here, resource allocation corresponding to the third PUSCH is the same as that corresponding to the first PUSCH.

Here, when the third PUSCH contains two transport blocks and the first PUSCH contains one transport block, the transport block of the first PUSCH is retransmitted on the two transport blocks of the third PUSCH. When the third PUSCH contains two transport blocks and the first PUSCH contains one transport block, the transport block of the first PUSCH is transmitted on either transport block of the third PUSCH. When the third PUSCH contains two transport blocks and the first PUSCH contains two transport blocks, the two transport blocks of the first PUSCH are respectively transmitted on the two transport blocks of the third PUSCH. When the third PUSCH contains one transport block and the first PUSCH contains two transport blocks, both the two transport blocks of the first PUSCH are transmitted on the one transport block of the third PUSCH.

When transmitting on either transport block of the third PUSCH, the number of transport layers for transmitting the first PUSCH is determined by one of: downlink control information (DCI) for scheduling the first PUSCH; and when the number of the transport layers of the transport block of the third PUSCH is greater than 1 and the number of the transport layers of the transport block of the first PUSCH is equal to 1, the first PUSCH is retransmitted on all the transport layers of the transport block of the third PUSCH.

When the third PUSCH contains two transport blocks and the first PUSCH contains one transport block, the transport block of the first PUSCH is transmitted on either transport block of the third PUSCH, and the transport block of the third PUSCH transmitting the first PUSCH is one of: a transport block having a maximal modulation and coding scheme (MCS); and a preset transport block.

Transmission Mode III

In the transmission mode III, the first PUSCH is transmitted on a symbol corresponding to the first PUSCH, and the third PUSCH is transmitted on a symbol except the symbol corresponding to the first PUSCH among symbols corresponding to the third PUSCHs. Here, transmission of a fourth PUSCH is abandoned or deferred until after the agreed transmission time of the fourth PUSCH, wherein the fourth PUSCH is a PUSCH except the first PUSCH and the third PUSCH among the two or more PUSCHs.

When at least one of information of the third PUSCH and information of the fourth PUSCH contains UCI, the UCI is transmitted on the first PUSCH.

When at least one of the information of the third PUSCH and the information of the fourth PUSCH carries UCI and if the UCI contains appointed information, the appointed information is transmitted on the first PUSCH.

When the third PUSCH contains UCI and a symbol corresponding to the UCI overlaps with a symbol corresponding to the first PUSCH, the UCI is transmitted on the first PUSCH.

When the information of the third PUSCH carries UCI and if the UCI contains appointed information, the appointed information is transmitted on the first PUSCH.

Here, the apparatus of this embodiment does not expect to receive first DCI, the first DCI schedules the transmitting terminal to transmit on an appointed symbol, and the appointed symbol includes at least one of:

a symbol corresponding to HARQ-ACK corresponding to at least one of the third PUSCH and the fourth PUSCH;

if at least one of the information of the third PUSCH and the information of the fourth PUSCH contains RI/CRI, the appointed symbol is a symbol corresponding to the RI/CRI; and if at least one of the information of the third PUSCH and the information of the fourth PUSCH contains CQI/PMI, the appointed symbol is a symbol corresponding to the CQI/PMI.

Here, when the symbol corresponding to the first PUSCH overlaps with the symbol corresponding to a demodulation reference signal (DMRS) of the third PUSCH, the DMRS is generated based on a frequency domain span of the first PUSCH and a frequency domain span of the third PUSCH.

Exemplarily, only an appointed PUSCH is transmitted on one transmission symbol, wherein the appointed PUSCH may satisfy one of following conditions: only the agreed transmission time of the appointed PUSCH among the two or more PUSCHs includes the transmission symbol; the agreed transmission time of a plurality of PUSCHs among the two or more PUSCHs includes the transmission symbol, and among the plurality of PUSCHs, the TTI length corresponding to the appointed PUSCH is the minimum. The transmission symbol is one symbol in a set of symbols contained in the agreed transmission time of the two or more PUSCHs.

When information of the second PUSCH carries UCI, the UCI is transmitted on the first PUSCH. When the information of the second PUSCH carries UCI and if the UCI contains appointed information, the appointed information is transmitted on the first PUSCH.

Transmission Mode IV

In the transmission mode IV, when frequency domain resources of the two or more PUSCHs do not overlap, the two or more PUSCHs are transmitted.

A demodulation reference signal (DMRS) is generated based on total frequency domain resources of the two or more PUSCHs.

Transmission Mode V

In the transmission mode V, a priority is determined based on at least one of a fact whether the two or more PUSCHs carry UCI and the UCI carried, it is selected to transmit the PUSCH having a top priority, and transmission of the remaining PUSCHs is abandoned or deferred until after the agreed transmission time of the remaining PUSCHs, wherein the remaining PUSCHs are PUSCHs except the PUSCH having the top priority among the two or more PUSCHs.

The determining a priority based on at least one of a fact whether the two or more PUSCHs carry UCI and the UCI carried may include at least one of:

the priority of a PUSCH carrying the UCI is higher than that of a PUSCH not carrying the UCI;

the priority of a PUSCH carrying the HARQ-ACK is higher than that of a PUSCH carrying at least one of RI/CRI and CQI/PMI;

the priority of a PUSCH carrying at least one of a broadband CQI/PMI is higher than that of a PUSCH carrying a narrowband CQI/PMI; and in the case that a type of the UCI carried is the same, the priority of a PUSCH corresponding to a small TTI length is higher than that of a PUSCH corresponding to a large TTI length.

When the remaining PUSCHs contain UCI, the UCI is transmitted on the PUSCH having the top priority.

When the information of the remaining PUSCHs carries UCI and if the UCI contains appointed information, the appointed information is transmitted on the PUSCH having the top priority.

In this embodiment, the UCI may include at least one of the HARQ-ACK, the RI/CRI, and the CQI/PMI.

The appointed information may include at least one of: the HARQ-ACK; at least one of the HARQ-ACK and the RI/CRI; and at least one of the HARQ-ACK, the RI/CRI and a preset type of CQI/PMI.

The preset type of CQI may be a broadband CQI, and the preset type of PMI may be a broadband PMI.

Figure 12:
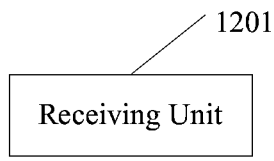
FIG. 12 is a block diagram illustrating an apparatus for receiving information according to an embodiment of the present application.

FIG. 12 is a block diagram illustrating an apparatus for receiving information according to an embodiment of the present application. As shown in FIG. 12, the apparatus for receiving information provided by this embodiment includes a receiving unit 1201. The receiving unit 1201 is configured to receive on one carrier wave according to at least one of a preset receiving mode and a receiving mode indicated by an eNB when agreed transmission time of two or more PUSCHs overlaps.

At least one of TTI lengths corresponding to the two or more PUSCHs is different. The PUSCH corresponding to the minimum TTI length among the two or more PUSCHs is a first PUSCH, the PUSCH except the first PUSCH among the two or more PUSCHs is a second PUSCH, and the PUSCH corresponding to the subminimal TTI length among the two or more PUSCHs is a third PUSCH.

Figure 13:
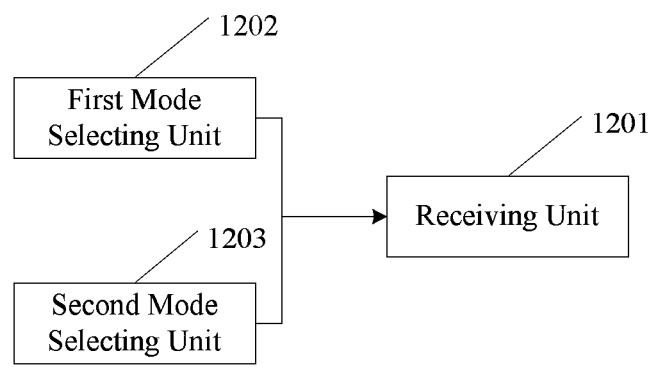
FIG. 13 is a block diagram illustrating another apparatus for receiving information according to an embodiment of the present application.

As shown in FIG. 13, the apparatus of this embodiment may further include: a first mode selecting unit 1202, configured to determine a receiving mode according to the TTI lengths corresponding to the two or more PUSCHs.

As shown in FIG. 13, the apparatus of this embodiment may further include: a second mode selecting unit 1203, configured to determine a receiving mode according to the TTI length corresponding to the first PUSCH among the two or more PUSCHs.

The receiving modes adopted by the receiving unit 1201 of this embodiment to receive information may include:

Receiving Mode I

In the receiving mode I, the first PUSCH is received. Exemplarily, reception of the second PUSCH is abandoned or deferred until after the agreed transmission time of the second PUSCH.

When information of the second PUSCH carries UCI, the UCI is received on the first PUSCH.

When the information of the second PUSCH carries UCI and if the UCI contains appointed information, the appointed information is received on the first PUSCH.

Receiving Mode II

In the receiving mode II, the third PUSCH is received. Exemplarily, reception of the PUSCH except the third PUSCH among the two or more PUSCHs is abandoned or deferred until after the agreed transmission time.

In an interleaving matrix corresponding to the third PUSCH, the information of the first PUSCH is written into columns corresponding to all or a part of symbols corresponding to the first PUSCH in the interleaving matrix.

Exemplarily, when the third PUSCH contains UCI and a symbol corresponding to the first PUSCH overlaps with a symbol corresponding to the UCI, the information of the first PUSCH is written into the interleaving matrix while skipping a location corresponding to the UCI.

When the symbol corresponding to the first PUSCH overlaps with a symbol corresponding to HARQ-ACK of the third PUSCH and in the case that the third PUSCH contains HARQ-ACK information or the third PUSCH does not contain the HARQ-ACK information, the information of the first PUSCH is written into the interleaving matrix while skipping a location corresponding to the HARQ-ACK.

When the information of the third PUSCH contains first UCI and the symbol corresponding to the first PUSCH overlaps with a symbol corresponding to the UCI in the information of the third PUSCH, the information of the first PUSCH is written into the interleaving matrix while skipping the location corresponding to the first UCI in the information of the third PUSCH. The first UCI includes at least one of the RI/CRI and the CQI/PMI.

When the information of the third PUSCH contains the HARQ-ACK and the symbol corresponding to the first PUSCH overlaps with a symbol corresponding to the HARQ-ACK in the information of the third PUSCH, after the information of the first PUSCH is written into the interleaving matrix, the HARQ-ACK is written.

Here, resource allocation corresponding to the third PUSCH is the same as that corresponding to the first PUSCH.

In this receiving mode, when the third PUSCH contains two transport blocks and the first PUSCH contains one transport block, the transport block of the first PUSCH is repeatedly received on the two transport blocks of the third PUSCH.

When the third PUSCH contains two transport blocks and the first PUSCH contains one transport block, the transport block of the first PUSCH is received on either transport block of the third PUSCH.

When the third PUSCH contains two transport blocks and the first PUSCH contains two transport blocks, the two transport blocks of the first PUSCH are respectively received on the two transport blocks of the third PUSCH.

When the third PUSCH contains one transport block and the first PUSCH contains two transport blocks, both the two transport blocks of the first PUSCH are received on the one transport block of the third PUSCH.

When receiving on either transport block of the third PUSCH, the number of transport layers for transmitting the first PUSCH is determined by one of: downlink control information (DCI) for scheduling the first PUSCH; and when the number of the transport layers of the transport block of the third PUSCH is greater than 1 and the number of the transport layers of the transport block of the first PUSCH is equal to 1, the first PUSCH is retransmitted on all the transport layers of the transport block of the third PUSCH.

When the third PUSCH contains two transport blocks and the first PUSCH contains one transport block, the transport block of the first PUSCH is received on either transport block of the third PUSCH, and the transport block of the third PUSCH receiving the first PUSCH is one of:

a transport block having a maximal modulation and coding scheme (MCS); and a preset transport block.

Receiving Mode III

In the receiving mode III, the first PUSCH is received on a symbol corresponding to the first PUSCH, and the third PUSCH is received on a symbol except the symbol corresponding to the first PUSCH among symbols corresponding to the third PUSCHs.

Exemplarily, reception of the fourth PUSCH is abandoned or deferred until after the agreed transmission time of the fourth PUSCH, wherein the fourth PUSCH is a PUSCH except the first PUSCH and the third PUSCH among the two or more PUSCHs.

When at least one of the information of the third PUSCH and the information of the fourth PUSCH contains UCI, the UCI is received on the first PUSCH.

When at least one of the information of the third PUSCH and the information of the fourth PUSCH carries UCI and if the UCI contains appointed information, the appointed information is received on the first PUSCH.

The receiving mode may further include: receiving, when the third PUSCH contains UCI and a symbol corresponding to the UCI overlaps with a symbol corresponding to the first PUSCH, the UCI on the first PUSCH.

When the information of the third PUSCH carries UCI and if the UCI contains appointed information, the appointed information is received on the first PUSCH.

The receiving terminal does not send first DCI, and the first DCI schedules the transmitting terminal to transmit on an appointed symbol, wherein the appointed symbol includes at least one of:

a symbol corresponding to HARQ-ACK corresponding to at least one of the third PUSCH and the fourth PUSCH;

if at least one of the information of the third PUSCH and the information of the fourth PUSCH contains RI/CRI, the appointed symbol is a symbol corresponding to the RI/CRI; and if at least one of the information of the third PUSCH and the information of the fourth PUSCH contains CQI/PMI, the appointed symbol is a symbol corresponding to the CQI/PMI.

When the symbol corresponding to the first PUSCH overlaps with the symbol corresponding to a DMRS of the third PUSCH, the DMRS is generated based on a frequency domain span of the first PUSCH and a frequency domain span of the third PUSCH.

Exemplarily, only an appointed PUSCH is received on one transmission symbol, wherein the appointed PUSCH satisfies one of following conditions:

only the agreed transmission time of the appointed PUSCH among the two or more PUSCHs includes the transmission symbol;

the agreed transmission time of a plurality of PUSCHs among the two or more PUSCHs includes the transmission symbol, and among the plurality of PUSCHs, the TTI length corresponding to the appointed PUSCH is the minimum; and the transmission symbol is one symbol in a set of symbols contained in the agreed transmission time of the two or more PUSCHs.

When the information of the second PUSCH contains UCI, the UCI is transmitted on the first PUSCH.

The receiving mode may further include: receiving, when the information of the second PUSCH carries UCI and if the UCI contains appointed information, the appointed information on the first PUSCH.

Receiving Mode IV

In the receiving mode IV, the two or more PUSCHs are received when frequency domain resources of the two or more PUSCHs do not overlap.

The DMRS is generated based on total frequency domain resources of the two or more PUSCHs.

Receiving Mode V

In the receiving mode V, a priority is determined based on at least one of a fact whether the two or more PUSCHs carry UCI and the UCI carried, it is selected to receive the PUSCH having a top priority, and reception of the remaining PUSCHs is abandoned or deferred until after the agreed transmission time of the remaining PUSCHs, wherein the remaining PUSCHs are PUSCHs except the PUSCH having the top priority among the two or more PUSCHs.

The determining a priority based on at least one of a fact whether the two or more PUSCHs carry UCI and the UCI carried may include at least one of:

the priority of a PUSCH carrying the UCI is higher than that of a PUSCH not carrying the UCI;

the priority of a PUSCH carrying the HARQ-ACK is higher than that of a PUSCH carrying at least one of RI/CRI and CQI/PMI;

the priority of a PUSCH carrying at least one of a broadband CQI/PMI is higher than that of a PUSCH carrying a narrowband CQI/PMI; and in the case that a type of the UCI carried is the same, the priority of a PUSCH corresponding to a small TTI length is higher than that of a PUSCH corresponding to a large TTI length.

When the remaining PUSCHs contain UCI, the UCI is received on the PUSCH having the top priority.

When information of the remaining PUSCHs carries UCI and if the UCI contains appointed information, the appointed information is received on the PUSCH having the top priority.

In the receiving mode provided by this embodiment, the UCI may include at least one of the HARQ-ACK, the RI/CRI, and the CQI/PMI.

The appointed information may include at least one of: the HARQ-ACK; at least one of the HARQ-ACK and the RI/CRI; and at least one of the HARQ-ACK, the RI/CRI and a preset type of CQI/PMI.

Here, the preset type of CQI may be a broadband CQI, and the preset type of PMI may be a broadband PMI.

Furthermore, an embodiment of the present application also provides a computer-readable medium storing a program for transmitting information. When the program is executed by a processor, steps of the method for transmitting information are implemented.

Moreover, an embodiment of the present application further provides a computer-readable medium storing a program for receiving information. When the program is executed by a processor, steps of the method for receiving information are implemented.

Those skilled in the art should realize that the embodiments of the present application may be provided as a method, a system or a computer program product. Therefore, the present application may use forms of a hardware embodiment, a software embodiment, or an embodiment in combination of software and hardware aspects. Furthermore, the present application may use forms of computer program products implemented on one or more computer storage media (including but not limited to a magnetic disk memory, an optical memory or the like) which includes a computer program code.

The present application is described in reference to the flowchart and/or block diagram of a method, a device (system) or a computer program product according to the embodiments of the present application. It is to be understood that each flow and/or block in the flowchart and/or block diagram as well as combination of flow and/or block in the flowchart and/or block diagram may be realized by computer program instructions. These computer program instructions may be provided to a general purpose computer, a special purpose computer, an embedded processor or processors of other programmable data processing equipment so as to generate a machine so that such a device configured to achieve functions designated in one or more flows of the flowchart and/or in one or more blocks of the block diagram is generated by means of instructions executed by computers or processors of other programmable data processing equipment.

These computer program instructions may be stored in a computer-readable memory which can lead a computer or other programmable data processing equipment to work in a particular way so that instructions stored in the computer-readable memory may generate a manufactured product comprising a command device which can achieve functions designated in one or more flows of the flowchart and/or in one or more blocks of the block diagram.

These computer program instructions may also be loaded onto computers or other programmable data processing equipment so that a series of operation steps are executed on the computers or other programmable equipment to generate a processing achieved by computers, thus providing steps for achieving functions designated in one or more flows of the flowchart and/or in one or more blocks of the block diagram by means of instructions executed by computers or other programmable equipment.

Those of ordinary skill in the art may understand that functional modules/units in all or some steps, systems or apparatuses in the method disclosed above may be implemented by software, firmware, hardware or any suitable combination thereof. In a hardware implementation, the division between functional modules/units mentioned in the above description does not necessarily correspond to the division of physical components. For example, one physical component may have multiple functions, or one function or step may be jointly performed by a plurality of physical components. Some or all the components may be implemented as software executed by a processor such as a digital signal processor or microprocessor, or may be implemented as hardware or an integrated circuit such as an application specific integrated circuit. Such software may be distributed on a computer readable medium, which may include a computer storage medium (or non-transitory storage medium) and a communication medium (or a transitory medium). As well known to those of ordinary skill in the art, the term computer storage media include volatile and non-volatile, removable and non-removable media implemented in any method or technology for storage of information, such as computer readable instructions, data structures, program modules, or other data. The computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer. Furthermore, as well known to those of ordinary skill in the art, communication media typically include computer-readable instructions, data structures, program modules or other data in a modulated data signal such as a carrier wave or other transport mechanism, and may include any information delivery media.

The above are merely exemplary embodiments of the present application, and are not intended to limit the scope of protection of the present application.

INDUSTRIAL APPLICABILITY

Embodiments of the present application provide a method and an apparatus for transmitting information, and a method and an apparatus for receiving information to implement information transmission in the case that PUSCHs having different TTI lengths overlap on agreed transmission time.

The invention claimed is:

1. A method for transmitting information, applied to a transmitting terminal and comprising:
    determining a transmission mode and transmitting two or more physical uplink shared channels (PUSCHs) on one carrier wave according to the determined transmission mode, in response to agreed transmission time of each of the two or more PUSCHs overlapping with each other on the carrier wave,
    wherein transmission time interval (TTI) lengths corresponding to the two or more PUSCHs are not completely a same,
    wherein the two or more PUSCHs comprise a first PUSCH corresponding to a minimum TTI length and a third PUSCH corresponding to a subminimal TTI length in a case where there are two PUSCHs, and further comprise at least one second PUSCH except the first PUSCH and the third PUSCH in a case where there are three or more PUSCHs, and wherein the determined transmission mode comprises one of:
a first transmission mode of transmitting the first PUSCH within the agreed transmission time of the first PUSCH, and abandoning transmission of at least one PUSCH except the first PUSCH among the two or more PUSCH, and wherein the first transmission mode further comprises:
transmitting, in a case where information of a PUSCH among the at least one PUSCH except the first PUSCH carries uplink control information (UCI), the UCI on the first PUSCH; or transmitting, in a case where the information of the PUSCH among the at least one PUSCH except the first PUSCH carries UCI and the UCI contains appointed information, the appointed information on the first PUSCH.

2. The method according to claim 1, wherein determining the transmission mode comprises at least one of following steps:
determining the transmission mode according to a transmission mode preset by the transmitting terminal,
determining the transmission mode according to a transmission mode indicated by a base station (eNB),
determining the transmission mode according to the TTI lengths corresponding to the two or more PUSCHs, or
determining the transmission mode according to the TTI length corresponding to the first PUSCH.

3. The method according to claim 1, wherein the determined transmission mode comprises a second transmission mode of transmitting the two or more PUSCHs according to a priority of each of the two or more PUSCHs, and
wherein the second transmission mode further comprises:
determining a priority for each of the two or more PUSCHs based on at least one of a fact whether the two or more PUSCHs carry UCI and the carried UCI;
transmitting a PUSCH having a top priority, and abandoning transmission of remaining PUSCHs or deferring the transmission of the remaining PUSCHs until after the agreed transmission time of the PUSCH having the top priority;
transmitting the UCI on the PUSCH having the top priority in a case where information of the remaining PUSCHs contains the UCI; and
transmitting appointed information on the PUSCH having the top priority in a case where the information of the remaining PUSCHs carries the UCI and the UCI contains the appointed information,
wherein the remaining PUSCHs are PUSCHs except the PUSCH having the top priority among the two or more PUSCHs, and
wherein a priority of a PUSCH carrying the UCI is higher than that of a PUSCH not carrying the UCI, a priority of a PUSCH carrying the HARQ-ACK is higher than that of a PUSCH carrying at least one of the RI, the CRI, the CQI and the PMI, a priority of a PUSCH carrying at least one of a broadband CQI and the PMI is higher than that of a PUSCH carrying at least one of a narrowband CQI and the PMI, and in the case that a type of the UCI carried is the same, a priority of a PUSCH corresponding to a small TTI length is higher than that of a PUSCH corresponding to a large TTI length.

4. The method according to claim 1, wherein the UCI comprises at least one of: a Hybrid Automatic Repeat request Acknowledgement (HARQ-ACK), a rank indication (RI), a channel state information-reference signal resource indication (CRI), a channel quality indicator (CQI), and a pre-coding matrix indicator (PMI), and
the appointed information comprises at least one of: a HARQ-ACK; at least one of the HARQ-ACK, an RI, and a CRI; or at least one of the HARQ-ACK, the RI, the CRI, a preset type of the CQI, and a preset type of the PMI.

5. A method for receiving information, applied to a receiving terminal and comprising:
determining a reception mode and receiving two or more physical uplink shared channels (PUSCHs) on one carrier wave according to the determined reception mode, in response to agreed transmission time of each of the two or more PUSCHs overlapping with each other on the carrier wave;
wherein transmission time interval (TTI) lengths corresponding to the two or more PUSCHs are not completely a same,
wherein the two or more PUSCHs comprise a first PUSCH corresponding to a minimum TTI length and a third PUSCH corresponding to a subminimal TTI length in a case where there are two PUSCHs, and further comprise at least one second PUSCH except the first PUSCH and the third PUSCH in a case where there are three or more PUSCHs, and
wherein the determined reception mode comprises:
a first reception mode of receiving the first PUSCH within the agreed transmission time of the first PUSCH, and abandoning reception of at least one PUSCH except the first PUSCH among the two or more PUSCHs, and
wherein the first reception mode further comprises:
receiving, in a case where information of a PUSCH among the at least one PUSCH except the first PUSCH carries uplink control information (UCI), the UCI on the first PUSCH; or receiving, in a case the information of the PUSCH among the at least one PUSCH except the first PUSCH carries UCI and the UCI contains appointed information, the appointed information on the first PUSCH.

6. The method according to claim 5, wherein determining the reception mode comprises at least one of:
determining the reception mode according to a reception mode preset by the receiving terminal,
determining the reception mode according to a reception mode indicated by a base station (eNB),
determining the reception mode according to the TTI lengths corresponding to the two or more PUSCHs, or
determining the reception mode according to the TTI length corresponding to the first PUSCH.

7. The method according to claim 5,
wherein the UCI comprises at least one of: a Hybrid Automatic Repeat request Acknowledgement (HARQ-ACK), a rank indication (RI), a channel state information-reference signal resource indication (CRI), a channel quality indicator (CQI), and a pre-coding matrix indicator (PMI), and the appointed information comprises at least one of: HARQ-ACK; at least one of the HARQ-ACK, an RI, and a CRI; or at least one of the HARQ-ACK, the RI, the CRI, a preset type of the CQI, and a preset type of the PMI.

8. The method according to claim 5, wherein the determined reception mode comprises a second reception mode of receiving the two or more PUSCHs according to a priority of each of the two or more PUSCHs, and
wherein the second reception mode further comprises:

determining a priority for each of the two or more PUSCHs based on at least one of a fact whether the two or more PUSCHs carry uplink control information (UCI) and the carried UCI;
receiving a PUSCH having a top priority, and abandoning reception of remaining PUSCHs or deferring the reception of the remaining PUSCHs until after the agreed transmission time of the PUSCH having the top priority;
receiving the UCI on the PUSCH having the top priority in a case where information of the remaining PUSCHs contains the UCI;
receiving appointed information on the PUSCH having the top priority in a case where the information of the remaining PUSCHS carries the UCI and the UCI contains the appointed information,
wherein the remaining PUSCHs are PUSCHs except the PUSCH having the top priority among the two or more PUSCHs, and
wherein a priority of a PUSCH carrying the UCI is higher than that of a PUSCH not carrying the UCI, a priority of a PUSCH carrying Hybrid Automatic Repeat reQuest-Acknowledgement (HARQ-ACK) is higher than that of a PUSCH carrying at least one of a rank indication (RI), a channel state information-reference signal resource indication (CRI), a channel quality indicator (COI), and a pre-coding matrix indicator (PMI), a priority of a PUSCH carrying at least one of a broadband CQI and the PMI is higher than that of a PUSCH carrying at least one of a narrowband CQI and the PMI, and in the case that a type of the UCI carried is the same, a priority of a PUSCH corresponding to a small TTI length is higher than that of a PUSCH corresponding to a large TTI length.

9. An apparatus for transmitting information, comprising:
a memory, configured to store instructions; and
a processor, configured to execute the instructions to perform:
determining a transmission mode and transmitting two or more physical uplink shared channels (PUSCHs) on one carrier wave according to the determined transmission mode, in response to agreed transmission time of each of the two or more PUSCHs overlapping with each other on the carrier wave;
wherein transmission time interval (TTI) lengths corresponding to the two or more PUSCHs are not completely a same,
wherein the two or more PUSCHs comprise a first PUSCH corresponding to a minimum TTI length and a third PUSCH corresponding to a subminimal TTI length in a case where there are two PUSCHs, and further comprise at least one second PUSCH except the first PUSCH and the third PUSCH in a case where there are three or more PUSCHs, and
wherein the determined transmission mode comprises one of:
a first transmission mode of transmitting the first PUSCH within the agreed transmission time of the first PUSCH, and abandoning transmission of at least one PUSCH except the first PUSCH among the two or more PUSCHs, and
wherein the first transmission mode further comprises:
transmitting, in a case where information of a PUSCH among the at least one PUSCH except the first PUSCH carries uplink control information (UCI), the UCI on the first PUSCH; or transmitting, in a case where the information of the PUSCH among the at least one PUSCH except the first PUSCH carries UCI and the UCI contains appointed information, the appointed information on the first PUSCH.

* * * * *